(12) United States Patent
Rodriguez et al.

(10) Patent No.: US 7,769,611 B1
(45) Date of Patent: Aug. 3, 2010

(54) SYSTEM AND METHOD FOR AUTOMATING TRAVEL AGENT OPERATIONS

(75) Inventors: Herman Rodriguez, Austin, TX (US); Newton James Smith, Jr., Austin, TX (US); Clifford Jay Spinac, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2758 days.

(21) Appl. No.: 09/704,569

(22) Filed: Nov. 3, 2000

(51) Int. Cl.
*G06Q 99/00* (2006.01)
(52) U.S. Cl. .............................................. 705/7; 705/8
(58) Field of Classification Search ................. 705/7, 705/8, 9, 10, 1, 6, 5
See application file for complete search history.

(56) References Cited

U.S. PATENT DOCUMENTS

| | | | |
|---|---|---|---|
| 4,773,042 A | 9/1988 | Edwards | 364/900 |
| 5,124,912 A | 6/1992 | Hotaling et al. | 364/411 |
| 5,237,499 A * | 8/1993 | Garback | 705/5 |
| RE34,476 E | 12/1993 | Norwood | 382/13 |
| 5,434,908 A | 7/1995 | Klein | 379/88 |
| 5,457,476 A | 10/1995 | Jenson | 715/823 |
| 5,533,097 A | 7/1996 | Crane et al. | 379/58 |
| 5,570,283 A | 10/1996 | Shoolery et al. | 364/407 |
| 5,657,378 A | 8/1997 | Haddock et al. | 379/93.23 |
| 5,724,092 A | 3/1998 | Davidsohn et al. | 348/14 |

(Continued)

FOREIGN PATENT DOCUMENTS

EP 0 634 877 A2 1/1995

(Continued)

OTHER PUBLICATIONS

"Automatic Recipient-Based Mail Routing for the Traveling User," IBM Technical Disclosure Bulletin (Abstract), Feb. 1994, p. 363-64.

(Continued)

Primary Examiner—Akiba K Robinson Boyce
(74) Attorney, Agent, or Firm—VanLeeuwen & VanLeeuwen; David A. Mims, Jr.

(57) ABSTRACT

A system and method for automatically performing actions in response to a user making travel arrangements. Delivery services, such as postal and parcel services, are instructed to take certain actions while the user is traveling. For example, the delivery can be instructed to hold packages for pickup by the user, deliver the packages to the user when the user returns, or forward the packages to another location. In addition, a system and method for notifying a company mailroom with travel instructions is included. An electronic calendar is automatically updated with information related to the user's travel plans. Other users with access to the calendar can view the user's travel agenda. The user can gather travel specific details from the calendar for use in traveling, for example the flight and hotel information, is readily available. The user's telephone can also be configured as preferred by the user. Calls can be forwarded to the user's travel location, voice mail greetings can be updated to reflect the user's out-of-office status, and backup and emergency information can be updated. Destination information such as driving information, GPS data for use by GPS devices, medical services information, and civic, cultural, or attraction information can be downloaded to the user for use while at the destination.

12 Claims, 21 Drawing Sheets

U.S. PATENT DOCUMENTS

| | | | |
|---|---|---|---|
| 5,724,411 A | 3/1998 | Eisdorfer et al. | 379/93.23 |
| 5,790,974 A * | 8/1998 | Tognazzini | 455/456.5 |
| 5,819,046 A | 10/1998 | Johnson | 395/200.57 |
| 5,832,451 A * | 11/1998 | Flake et al. | 705/5 |
| 5,877,759 A | 3/1999 | Bauer | 345/339 |
| 5,893,091 A | 4/1999 | Hunt et al. | 707/3 |
| 5,923,845 A | 7/1999 | Kamiya et al. | 395/200.36 |
| 5,973,619 A * | 10/1999 | Paredes | 340/994 |
| 5,995,939 A * | 11/1999 | Berman et al. | 705/3 |
| 6,009,408 A * | 12/1999 | Buchanan | 705/11 |
| 6,014,090 A | 1/2000 | Rosen et al. | 340/905 |
| 6,018,572 A | 1/2000 | Foladare et al. | 379/211 |
| 6,058,415 A | 5/2000 | Polcyn | 709/200 |
| 6,076,121 A | 6/2000 | Levine | 710/62 |
| 6,256,639 B1 * | 7/2001 | Himmel et al. | 707/104.1 |
| 6,401,085 B1 * | 6/2002 | Gershman et al. | 707/4 |
| 6,470,394 B1 | 10/2002 | Bamforth et al. | 709/241 |
| 6,553,108 B1 * | 4/2003 | Felger | 379/114.01 |
| 6,640,230 B1 * | 10/2003 | Alexander et al. | 707/10 |
| 6,836,537 B1 | 12/2004 | Zirngibl et al. | 379/67.1 |
| 2002/0111845 A1 * | 8/2002 | Chong | 705/8 |
| 2003/0069777 A1 * | 4/2003 | Or-Bach | 705/9 |

FOREIGN PATENT DOCUMENTS

| | | |
|---|---|---|
| JP | 02000184471 A | 6/2000 |

OTHER PUBLICATIONS

"Automating Paper Mail Sorting and Delivery Route Determination," IBM Technical Disclosure Bulletin (Abstract), Sep. 1993, p. 447-48.

"How do I Use the Mail Vacation Service," Information Technology Services, The University of Western Ontario, Internet Web Site, Jun. 1997, p. 1-4.

* cited by examiner

SYSTEM AND METHOD FOR AUTOMATING TRAVEL AGENT OPERATIONS

RELATED APPLICATIONS

This application is related to the following co-pending U.S. Patent Applications filed on the same day as the present application and having the same inventors and assignee: "System and Method for Optimizing Travel Reservations," Ser. No. 09/704,571 by Ponzini, Rodriquez, Smith, and Spinac; "System and Method for Updating User Home Automation System," Ser. No. 09/704,573 by Rodriquez, Smith, and Spinac; and "System and Method for Downloading Travel Packages" Ser. No. 09/704,585 by Rodriquez, Smith, and Spinac.

BACKGROUND OF THE INVENTION

1. Technical Field

The present invention relates in general to a method and system for automating travel agent operations. More particularly, the present invention relates to a system and method for optimizing a user's travel services using user and business profiles.

2. Description of the Related Art

Computer systems in general and International Business Machines (IBM) compatible personal computer systems in particular have attained widespread use for providing computer power to many segments of today's modern society. Systems with microprocessors are finding themselves in an array of smaller and more specialized objects that previously were largely untouched by computer technology. Computer systems typically include a system processor and associated volatile and non-volatile memory, a display area, input means, and often interfaces, such as a network interface or modem, to other computing devices.

These computing devices are information handling systems which are designed primarily to give independent computing power to a single user, or a group of users in the case of networked computing devices. Personal computing devices are often inexpensively priced for purchase by individuals or businesses. Nonvolatile storage devices such as hard disks, CD-ROM drives and magneto-optical drives are considered to be peripheral devices. Computing devices are often linked to one another using a network, such as a local area network (LAN), wide area network (WAN), or other type of network, such as the Internet.

One of the distinguishing characteristics of these systems is the use of a system board to electrically connect these components together. At the heart of the system board is one or more processors. System manufacturers continually strive for faster, more powerful processors in order to supply systems for demanding applications.

Computer systems have become increasingly integrated with people's day-to-day lives. For example, many people keep their calendars electronically on a computer system. Another example is sending notes electronically as email rather than using postal or courier services. Computer automation has also proliferated to peoples' homes. For example, many people have "smart houses" that include home automation technology. This technology enables lights, appliances, and other devices to operate automatically. Computer technology has also improved consumer banking. Consumers can now transfer money and pay bills electronically without having to write and deliver checks. Even telephone systems are increasingly computerized with computers interfacing with telephone systems and configuring the telephone according to the user's preferences. Telephone control may even reside in the user's personal computer.

In this increasingly modern age, work life is often fast-paced and global in nature. Because of these factors, workers in many industry segments travel or are out of the office for many days throughout the year. The fast-paced nature of many industries causes workers to change their schedules and plans on a daily basis. When the user needs to travel, there are often many activities that should be performed prior to the user's travel date, while the user is traveling, and just prior to the user's return to the office. These activities include: (1) updating the user's electronic calendar, (2) withdrawing money for the trip, (3) sending emails informing others that the user will be away, (4) changing home automation settings to turn lights and appliances on/off when the user is away, (5) configuring the telephone to forward telephone calls or change the voice mail greeting provided to callers, (6) hold or forward home mail deliveries, (7) hold or forward home parcel deliveries, (8) hold or forward mail and parcels received by the company mailroom, (9) hold newspaper delivery, as well as other travel-related activities not mentioned above.

Currently, users perform travel related activities manually with little or no automation. Manually performing these activities is challenging to the user when facing the fast-paced work and travel environment of modern business. Because of the number of activities, it is difficult for users to remember to handle all travel-related tasks before traveling away from the office. Once away from the office, it is often much more difficult to perform travel related functions remotely. For example, to extend travel plans and have the post office hold mail longer, the user needs to contact his post office from a remote location and ask to have his mail held for an extended time. Contact information for local services, such as the post office or company mailroom, is often difficult to obtain when the user is at a remote location. What is needed, therefore, is a method for automating travel related actions to dynamically adjust to a user's ever-changing travel plans.

SUMMARY

It has been discovered that a travel agent can maintain a travel profile for users to perform actions that the user wishes to execute while the user is away from the office. These actions can be bundled into a travel package that is transmitted to the user in response to the user making travel arrangements. The travel agent can be an automated agent, such as an on-line travel agent, or a traditional brick-and-mortar travel agent that is used by the traveler. The travel agent processes the user's travel request and reads the user's profile for actions that the user would like to take while he is away. Once the actions are combined into a travel package, they are transmitted for processing. Optionally, the travel package can be received by the user so that the user has an opportunity to accept or reject individual actions within the travel package.

Once the actions are accepted, various processes take place depending upon the action and the user's preferences. One action is designed to notify the company mailroom of the user's delivery instructions. Another action is designed to notify mail and parcel services for handling of the user's home mail and parcel deliveries. An action is included for configuring the user's telephone while the user is away. Another action automatically updates the user's electronic calendar. Another action downloads emergency and medical information to the user's pervasive computing device related to health services at the traveling destination. Another action downloads travel related points of interests, restaurant information, and driving instructions to the user's pervasive computing device. Traveling points of interest while in route to the final destination are also downloaded, such as an exhibit at an airport that the user is passing through or an event in a town along the user's driving route. Another action informs colleagues and contacts that the user will be out of the office. This action discriminates between users to allow some users, for example family members, to view all travel details, while other users will only receive summary information. Another action updates the user's home automation system to enter an "away" mode while the user is out of town and resets the system to a "home" mode upon the user's return. As seen by the many actions performed by the system, the downloadable travel package is flexible to provide actions for new situations that may be encountered by travelers.

These actions can be combined into a travel package by the travel agent. If the user wants to accept actions before they are performed, the travel package is optionally sent to the user. If the package is sent, the user browses the travel package and accepts or declines any or all of the actions included in the package. The accepted actions are executed performing the travel related services described above. If the user chooses not to have the package sent to him, the automated actions are performed automatically.

Another approach uses an electronic calendaring system for optimizing a user's travel reservations based on user preferences. The system provides one or more possible travel packages based on the user's preferences and, if applicable, business policies or rules. The user selects a preferred package and the system, in turn, optimizes the package by querying servers containing travel information. Optimization is based upon the user's preferences and, if applicable, business policies or rules. In this manner, the user can book components of the trip and lock in on the best options available. The user can book certain components, for example airline reservations, before other aspects of the trip are booked. Optimization includes checking for combination deals that may be offered, such as hotel packages that include rental cars. However the reservations are made, vActions will be created to perform travel related tasks on behalf of the user.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
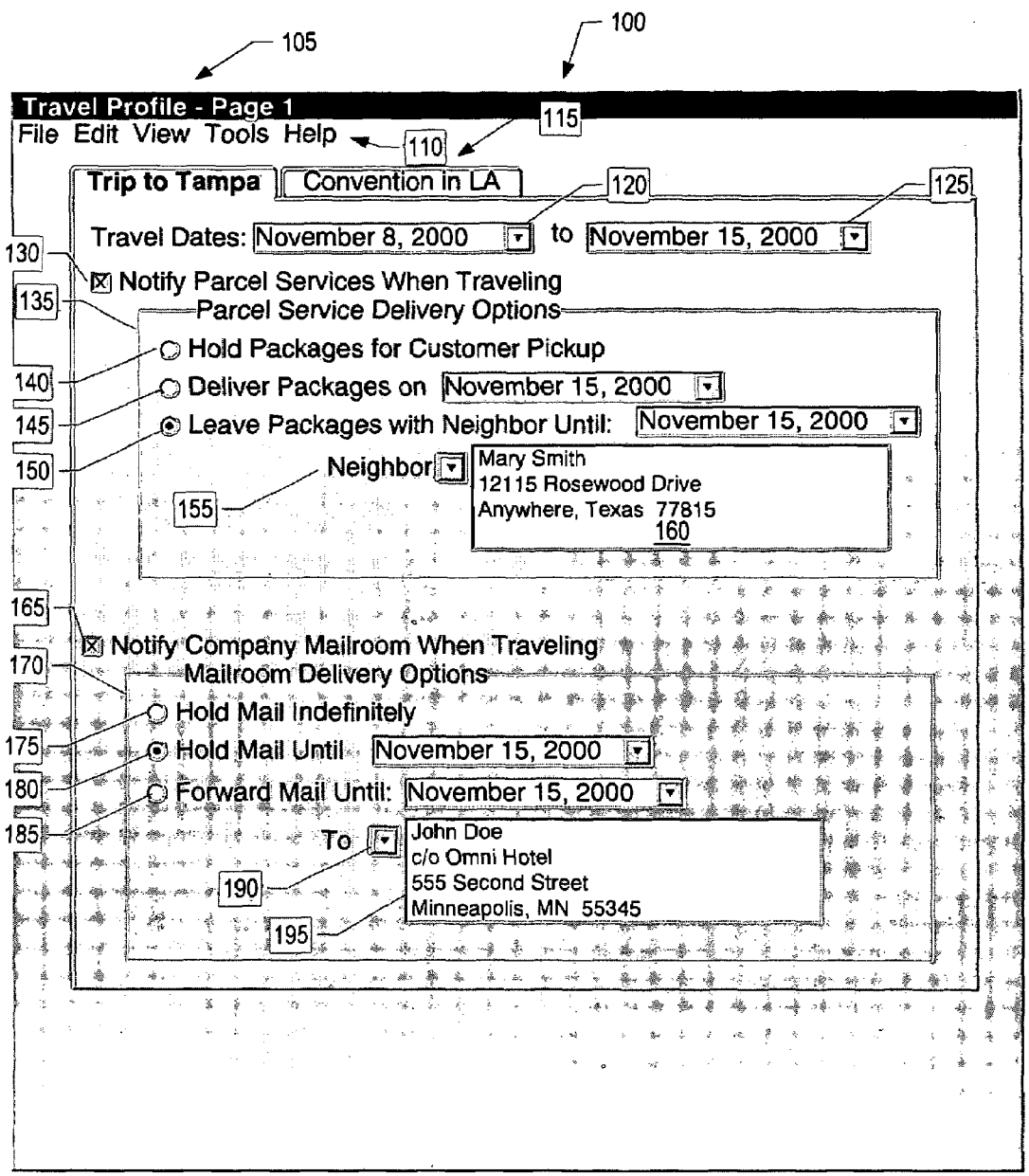
FIG. 1 is a user interface screen for configuring a user's travel profile.

FIG. 1 shows the first page of a travel profile screen 100 which allows the user to select actions that take place while the user is traveling. Travel profile screen 100 includes title bar 105 indicating that the user is viewing the first page of the travel profile. Travel profile screen 100 also includes menu bar 110. Menu bar 110 includes drop-down menu items for printing, saving the profile, editing profile information, changing the profile view, using profile-related tools, and receiving help. Travel profile screen 100 includes tabbed dialogs 115 for the various trips the user is scheduled to take. Tabbed dialogs 115 is currently showing information related to the users "Trip to Tampa." If the user selected the "Convention in LA" profile, information for that trip would be displayed. While this embodiment shows a tabbed dialog for organizing and presenting information, other organizational methods, such as frames or command buttons, could also be used to organize the user's trip information. To add or remove a trip from the tabbed dialog, for example in response to a change in travel plans, the user would select the "File" menu item and select "New," "Remove," "Rename," or "Copy" within the File menu choices. The "Copy" option allows the user to copy the information for another trip.

The travel dates for the Trip to Tampa are shown using start date 120 combo box and end date 125 combo box. When the user presses the down-arrow to the right of the control, a calendar is displayed to the user for selecting the appropriate date.

Check box 130 is checked by the user if the user wishes to notify home parcel services while the user is away. When check box 130 is selected, parcel service delivery options 135 become enabled. The user then selects either option 140 to have the parcel services instructed to hold packages until the user returns, option 145 to instruct the parcel services to deliver packages to the user at a future date. The delivery date defaults to end date 125 but may be changed by the user if needed. Again, if the user selects the down-arrow beside the delivery date a calendar is displayed allowing the user to select the desired delivery date. When checked, Option 150 instructs the parcel services to leave packages with a neighbor until a future date. In the example shown, Option 150 has been selected as indicated by the black selection mark appearing in Option 150. The date shown for option 150 again defaults to end date 125 but can be changed by the user to indicate a different date. Neighbor drop-down box 155 allows multiple neighbors to be stored in the system so that future neighbor settings can be selected without entering the necessary neighbor information. Neighbor text box 160 shows the neighbor information corresponding with the selected neighbor and can be edited by the user as needed. In this manner, the user can select from stored neighbor addresses without having to repeatedly enter information pertaining to a particular neighbor. In addition it would be possible to have a first neighbor contact followed by a second, and other neighbors so that packages that need to be signed for can be delivered if the first neighbor is away. Note that option 150 may also be used to forward packages to the user by specifying an indefinite end date and by entering information about the user's forwarding address in the neighbor text box 160.

Check box 165 is used to notify a company mailroom when the user is traveling. The company mailroom contact information is entered by the user by using the "Tools" menu item within menu bar 110. When check box 165 is selected (as shown by the "x" in FIG. 1), mailroom delivery options 170 are enabled to allow the user to select a delivery option. Option 175 is selected to hold the company mail in the mailroom indefinitely, for example until the user changes the selection to forward the kept mail or to deliver the mail (options 180 and 185). Option 175 may be selected when the user is not sure when he will be returning or does not know the address of a forwarding location where the user will be staying. Option 180 is similar to option 145 whereby the mail is held and then delivered on a given date. Likewise, option 185 is similar to option 150 whereby the mail is forwarded to another location until a future date. The future date defaults to the scheduled end date 125 but may be changed by the user as needed. Drop-down box 190 allows the user to select a forwarding location. Forwarding location text box 195 shows the corresponding address information for the forwarding location. Forwarding locations can be preset, for example with addresses of other company sites, and can also be customized by the user. By storing the forwarding location information, the forwarding address information does not need to be re-entered when the user is traveling to the same location again.

Figure 2:
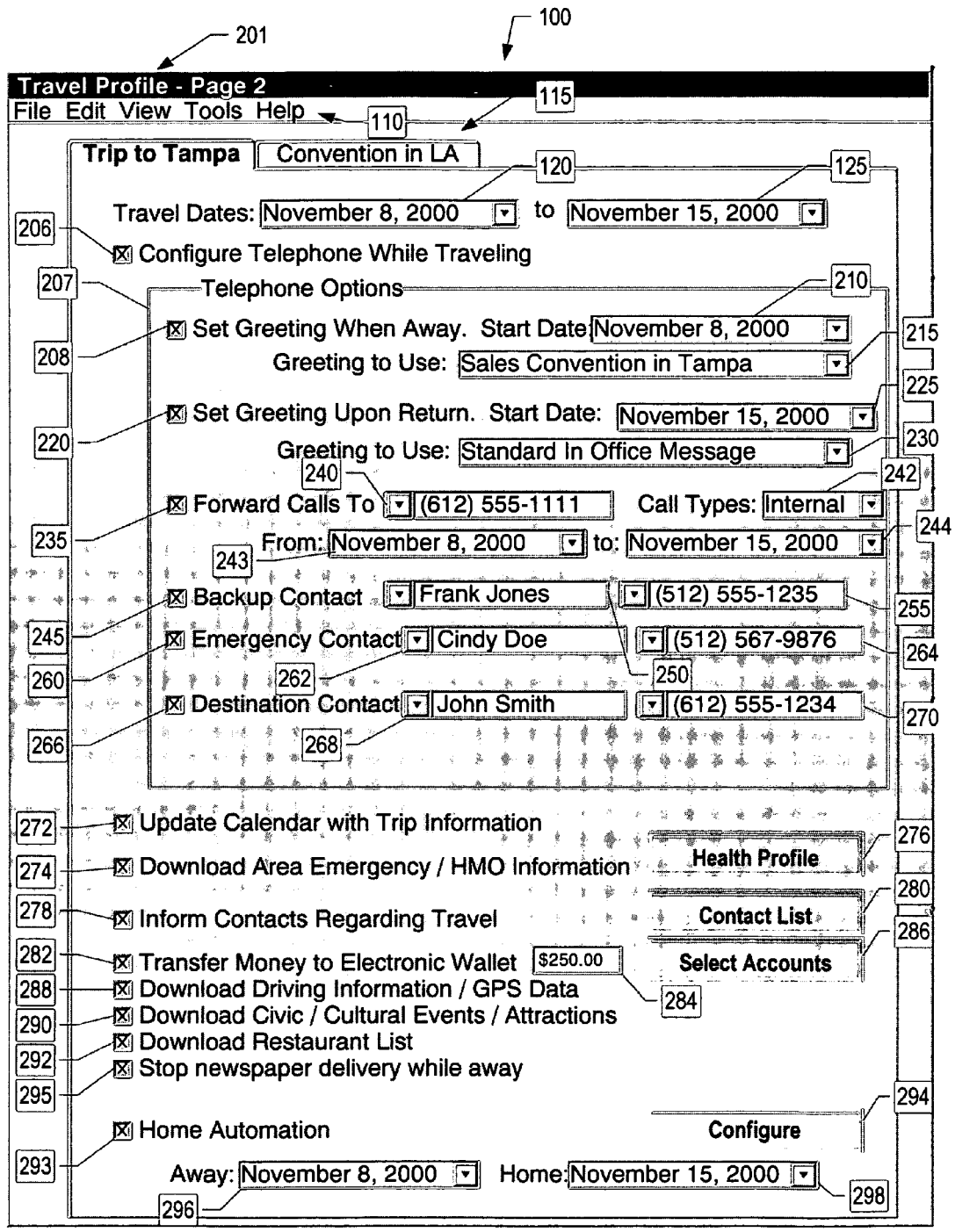
FIG. 2 is a second user interface screen for configuring a user's travel profile.

FIG. 2 shows the second page of travel profile screen 100 used to allow the user to select actions that take place while the user is traveling. Travel profile screen 100 includes title bar 201 indicating that the user is viewing the second page of the travel profile. Travel profile screen 100 also includes menu bar 110. Menu bar 110 includes the same drop-down menu items as provided on page 1 of the travel profile screen (see FIG. 1). Travel profile screen 100 also includes the same tabbed dialogs 115 as were present for page 1 of the profile. Tabbed dialogs 115 is currently showing information related to the users "Trip to Tampa." If the user selected the "Convention in LA" page 2 profile information for that trip would be displayed. To add or remove a trip from the tabbed dialog, for example in response to a change in travel plans, the user would select the "File" menu item and select "New," "Remove," "Rename," or "Copy" within the File menu choices.

Check box 206 is checked by the user if the user wishes to configure his telephone while the user is away. When check box 206 is selected, telephone configuration options 207 become enabled. Check box 208 indicates whether the user wants the system to set a voice mail greeting while the user is away. Greeting start date 210 defaults to travel start date 120 specified for the trip. Greeting start date 210 can be modified by the user to select a date that is either before or after the start date. Stored greeting message box 215 specifies a named greeting to use while the user is away. The drop down button to the right of greeting message box 215 is used to select from predefined greetings the user has stored. When the drop down button is selected, a list box is displayed showing the other greetings from which the user can select. In the example shown, a greeting named "Sales convention in Tampa" has been selected. While this greeting is specific for a certain trip, a more generic "out of office" message may also be configured and used. In addition, a generic out of office message may be used with the computer supplying the start and end dates of the trip. For example, the user could provide a message such as "Hi, you've reached John Doe's voice mail. I will be out of the office from [start_date] to [end date]. If this is an emergency, please contact [backup_contact]." The variables in brackets ([ ]) may be supplied by the computer using audio phases previously stored by the user.

Option 220 is used to have the system set the voice mail greeting upon the user's return to the office. Again, the user can specify a start date 225 that he wishes for the "in office" greeting to be set. Start date 225 defaults to the end date of the trip, but may be modified as necessary by the user. The user can select from a list of greetings 230 to use for the in-office greeting. Here, the user has chosen the "Standard in Office Message" for the greeting message upon the user's return.

Option 235 allows the user to request phone calls be forwarded to a specified phone number 240. The user can also specify the types of phone calls to be forwarded by using drop down box 242. In the example shown, only "Internal" calls will be forwarded to phone number 240. Other, non-internal phone calls will be received by the voice mail system and the caller will hear the predefined greeting (greeting 215 or greeting 230, depending upon the date of the call). Other types of calls that could be provided in drop down box 242 would include "External" calls and "All" calls. The company's internal telephone switch (i.e. a PBX) would have the ability to distinguish between external and internal calls and handle each appropriately. The call forwarding start date 243 defaults to trip start date 120 and the call forwarding end date 244 defaults to the trip end date. Each of these dates can be altered as needed by the user. Specifying a call forwarding end date 244 prevents the user from being back in the office and forgetting to un-forward the user's phone.

Option 245 allows the user to specify a backup contact that will provide backup service for the user while the user is away. A backup name 250 is provided and can be saved along with a backup phone number 255. In this manner, multiple backup contacts and their respective phone numbers can be saved for future use. In some voice mail and company phone systems, a caller is presented with an option to press a certain key to be connected with a backup person. Backup phone number 255 can be used to automatically connect a caller with a backup contact when the user presses the predefined telephone key combination (e.g., the pound sign (#)).

Option 260 allows the user to specify an emergency contact that will provide information in case of an emergency. An emergency contact name 262 is provided and can be saved along with an emergency contact phone number 264. In this manner, multiple emergency contacts and their respective phone numbers can be saved for future use. The information can be used by emergency workers in case of an emergency with the individual. Option 266 allows the user to include destination contact name 268 and corresponding destination contact phone number 270 so that the user's family and colleagues can contact the user at his travel destination. Emergency, destination, and backup contact information could be included in the user's telephone voice mail message or downloaded to the user's mobile telephone or personal digital assistant (PDA). Such information could also be included in contact messages that are sent to the user's family and business contacts (see FIG. 10).

Option 272 is selected to update the user's electronic calendar with information pertaining to the trip. This calendar information reminds the user about the trip and can also be used to print out trip information (i.e. flight times and flight numbers, rental car reservation information, hotel information, etc.) useful to the user when traveling. This information can also be used by the user's colleagues when scheduling meetings or trying to reach the user. Colleagues such as managers and secretaries may have access to view the detailed calendar entries in order to track down the user if needed. Other colleagues may only see that the user is out of the office during the given dates and the name/phone number of the user's backup.

Option 274 is used to request that emergency and HMO information be downloaded for the user. Health profile command button 276 is used to specify the user's insurance and other health preferences. When option 274 is selected, the system searches a database of health care information available for the travel destination. In the example shown, health care information for Tampa, Fla. would be searched and matched against the user's health care profile. In this manner, the user will know the address and driving instructions for Tampa area hospitals and emergency rooms. Those health care providers that have been approved by the user's HMO or health insurance company are also indicated. In addition, GPS coordinate data is also downloaded for use in a GPS system.

Option 278 is used to inform colleagues, family, friends, and associates of the user that the user will be away. Contact list command button 280 is used to specify various classes of contacts to be notified. Contact list command button 280 allows the user to select contacts from contact lists available to the user, such as a distribution list, contacts from the user's email program, or company provided email lists. Depending upon the type of recipient, various information can be provided. For example, the user may specify that close friends and family receive an email including all the travel details. Business colleagues, on the other hand, may receive an email including a limited subset of information letting them know that the user is in Tampa at a sales convention. Clients or customers may only receive an email that the user is out of the office and letting them know whether their emails will be received while the user is away and the name/phone number of the user's backup.

Option 282 allows the user to transfer money to an electronic wallet or other type of debit card. The amount of money to transfer is specified in text box 284, in this case the user has requested that $250 be transferred. Select Accounts command button 286 is used to select the user or company bank account from which to transfer money and the electronic wallet or debit card information to which the money is transferred.

Option 288 allows the user to have driving information and GPS data downloaded to a GPS device. GPS data regarding the destination, in this case GPS data regarding the Tampa, Fla. area is downloaded. The downloaded information may be in the form of an email attachment or may be a file transfer directly to a device accessible by the user. The destination address for the downloaded information is specified using the "Tools" option within menu bar 110. The address to which the information is downloaded is provided in a customization option. As a default, the information is emailed to the user using the email address specified for the user.

Option 290 downloads information regarding various civic events, cultural events, or area attractions to the user. Information can include driving directions to the event that can be loaded into the user's GPS device. This information is retrieved from a database of area attractions. In this case, information regarding events in route as well as in and around Tampa is selected for the time period that the user will be in the Tampa area. The event information can be further filtered by the user by selecting the "Tools" menu item within menu bar 110 and customizing the attractions for which the user has an interest. In this way, information about operas will not be provided to the user unless the user has indicated an interest in operas.

Option 292 is used to download information for restaurants in the travel destination. Again, the user can customize the restaurant preferences using the "Tools" menu item within menu bar 110. Restaurant preferences can limit selections based on type of food (e.g., Mexican, Chinese, etc.), style of food (e.g., fast food, casual, formal), and distance from the user (i.e. only restaurants within a 5 mile radius). The distance parameter can be calculated based upon the distance restaurants are from the user with a GPS device or the distance restaurants are from the user's hotel or other location.

Option 295 is used to send a message to the user's newspaper or carrier and request that the newspaper not be delivered while the user is away.

Option 293 is used to manage home automation settings, for example using the X-10 home automation protocol, while the user is away and upon his return. Home automation configuration button 294 is used to select what activities the user wants automatically performed while the user is away and while the user is at home. Home automation solutions often use a PC or a home automation device to store profiles for use by the system. A "home" profile setting includes the home automation functions that the user wishes to have performed while the user is in town, while the "away," or "out of town," profile provides functions the user wishes to have performed while traveling. Home automation settings can be used to turn appliances and lights on or off at certain times and can further be used in conjunction with a home security system to provide security functions. Configurations can be saved so that the user can retrieve prior established settings without having to re-enter the automation details. Away date 296 specifies the date that the away automation settings begin while home date 298 specifies the date that the at-home automation settings will be restored. These dates default to start date 120 and end date 125, respectively. Away date 296 and home date 298 can be altered from the default dates by selecting the down arrow beside the respective dates and choosing a different date.

Figure 3:
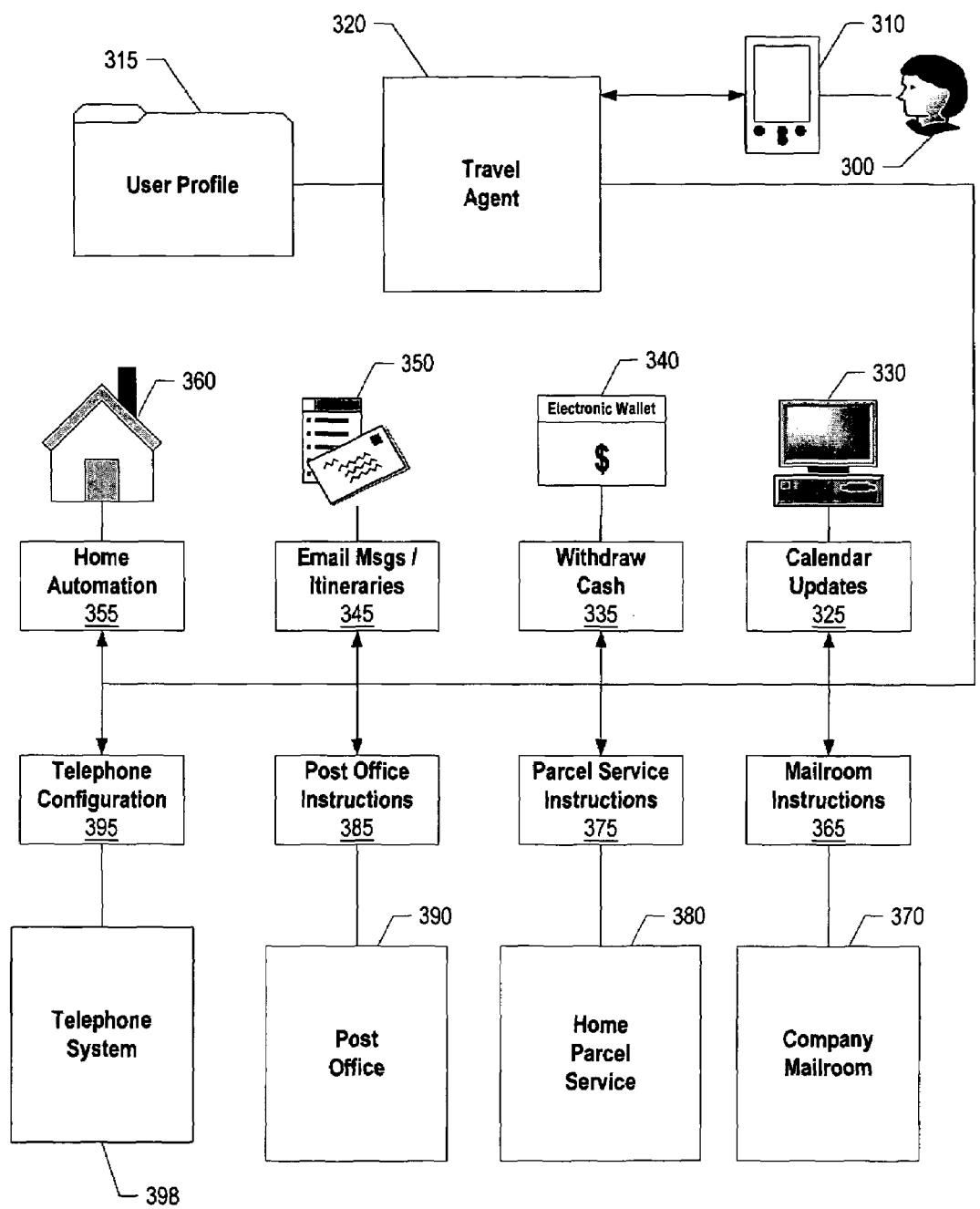
FIG. 3 is an entity action diagram showing various entities receiving instructions and commands related to the user's travel.

FIG. 3 shows a high level diagram of the activities involved with user 300 interacting with travel agent 320 to perform various actions. As used herein, a travel agent includes an on-line travel agent, such as Expedia™ available on the Internet, a traditional travel agent with human agents, or a PC based travel agent program that is programmed to make travel arrangements by contacting various travel services. User 300 is shown using a hand held computing device 310 to receive and send information to travel agent 320. A hand held computing device is advantageous because of its portability, however other types of computing devices such as laptop computers, pervasive computing devices, mobile telephones, and the like can be used as computing device 310.

Travel agent 320 maintains user profile 315 that was established by the user to include the user's travel preferences (see FIGS. 1 and 2). Travel agent 320 is either an automated agent, such as an online travel agent, or alternatively is a non-automated travel agent with human agents that assist customers with their travel plans. Once a travel plan has been initiated, travel agent 320 packages actions based upon user profile 315 settings and transmits the actions to various automated agents to perform the requests on behalf of user 300. Calendar update actions 325 are transmitted to computer 330 and update the user's electronic calendar. Withdraw cash action 335 is transmitted to the user's financial institution whereupon the balance of the user's electronic wallet 340 or debit card is increased and the selected bank account is decreased. Itinerary action 345 is transmitted to an email distribution agent that transmits email to distribution lists 350 based upon the recipients' relationship with user 300. For example, one distribution list may be used to send complete itinerary information to the user's family and secretary. A second distribution list may be used to send summary information to the user's colleagues, and a third distribution list may be used to send emails to the user's customers or clients letting them know that the user will be out of the office and the name/phone number for the user's backup.

Home automation package 355 includes home automation settings and is sent to the user's home 360 for use by the user's home automation system. When the user is away, a profile configured to, for example, turn lights on and off, while the user is away is used to configure the home automation system. Likewise, when the user is scheduled to return, a second automation profile is sent to the user's home with automation instructions the user uses while he is at home.

Mailroom actions 365 are transmitted to the company mailroom 370 using email or another protocol used by the mailroom for receiving instructions. The mailroom will now know whether to hold the user's mail, forward it to another location, or deliver the mail to the user upon his return. Parcel service action 375 likewise informs the common home parcel services 380 used by the user that parcel deliveries should be left with a neighbor, held for customer pickup, or delivered when the user returns. Postal service action 385 likewise informs the post office branch serving the user that mail services should be stopped, delivered when the user returns, or forwarded to another address. Mailroom actions 365, parcel service actions 375, and post office actions 385 may alternatively use encryption and digital signatures or digital certificates to verify that the user has authorized the mail instructions and for security regarding the user's whereabouts.

Telephone configuration actions 395 are transmitted to a computer system connected to the user's phone or to the company's telephone switch using a protocol understood by the telephone or switch 398. Telephone configuration actions 395 are used to configure the user's telephone by forwarding calls to another number, changing the voice mail greeting, and/or changing the backup or emergency contact information.

Computing device 310 is used to receive area emergency and health provider information, receive GPS information and driving directions, receive civic, cultural, and attraction information, and receive restaurant information. Ideally, computing device 310 also has GPS capabilities and wireless communication capabilities allowing the device to receive data easily and the ability to use downloaded GPS data.

Figure 4:
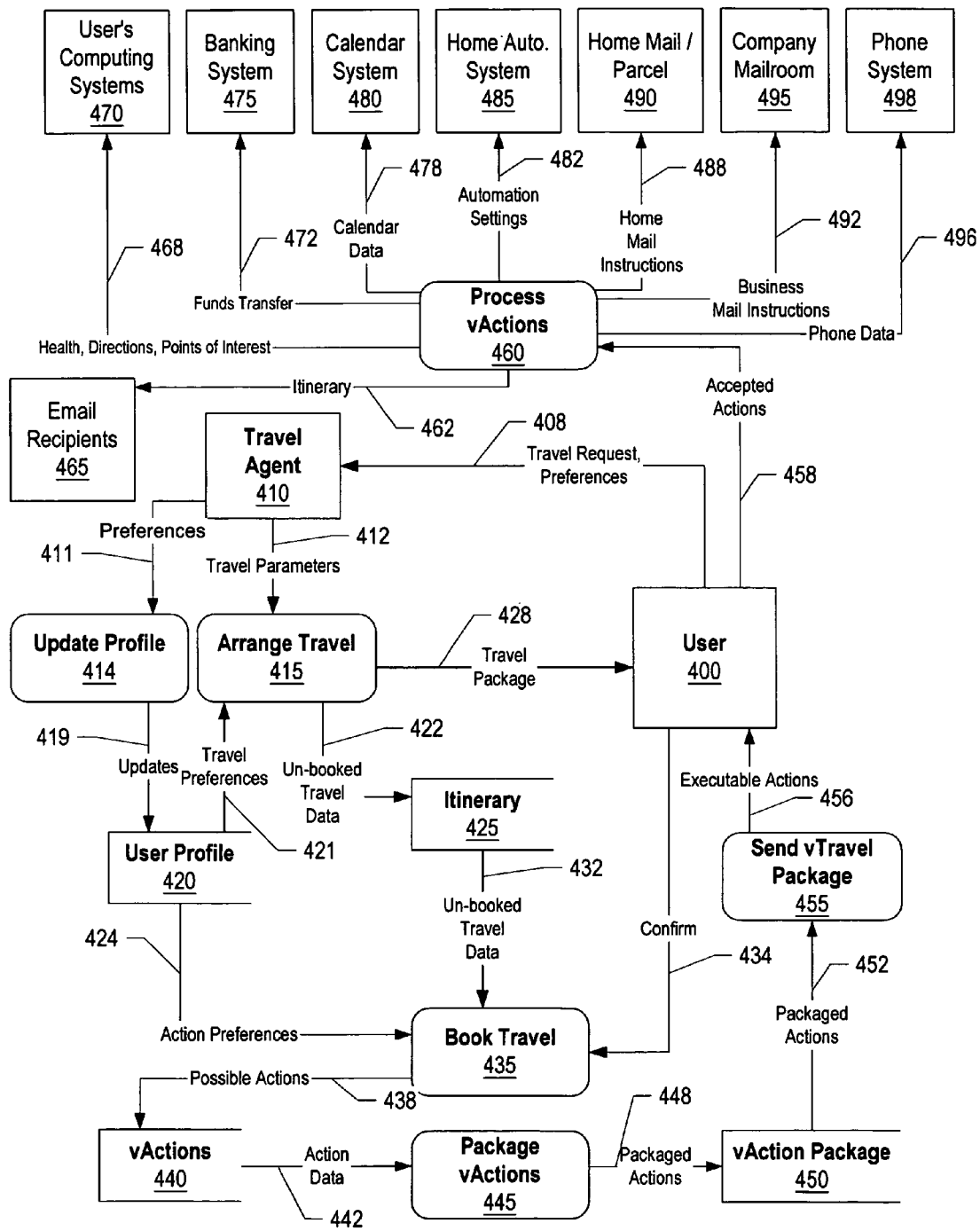
FIG. 4 is a dataflow diagram showing data included in the system flowing among various processes and external entities.

FIG. 4 shows a data flow diagram of the processes, data stores, and entities involved in the system and the data flowing among the various processes, stores, and entities. User 400 sends travel requests and preferences 408 to travel agent 410 using a standard protocol such as HTTP, secure-HTTP (HTTPS), file transfer protocol (FTP), or an email protocol (i.e. MIME). Travel agent 410 receives the request and/or preferences and processes them. Travel preferences data flow 411 are sent to update profile process 414 which responsively stores updates 419 in user profile 420. Travel request parameter data flow 412 is sent to arrange travel process 415. Arrange travel process 415 reads user profile data store 420 and receives travel preferences data flow 421. Arrange travel process 415 stores un-booked travel data 422 in itinerary data store 425. Arrange travel process 415 sends travel package data flow 428 to user 400 for optional confirmation action. User 400, in turn, provides confirmation data flow 434 to book travel process 435. Book travel process 435 reads un-booked travel data 432 from itinerary data store 425. Book travel process books the travel with service agents (i.e. airlines, hotels, rental cars) and prepares possible automated actions (called "virtual actions," or "vActions"). vAction data 438 is stored in vAction data store 440. Package vAction process 445 reads action data 442 from vAction data store 440 and packages the set of vActions. The packaged vAction data 448 is stored in travel package data store 450. Send vTravel package process 455 reads packaged actions 452 from travel package data store 450 and in turn sends executable vTravel actions 456 to user 400. User 400 has an opportunity to accept or reject actions that have been prepared, packaged, and delivered to the user. Accepted action data 458 corresponding with accepted actions is sent to execute vActions process 460. vActions process 460 sends itinerary data flow 462 to email recipients 465. vActions process 460 also sends health, directions, GPS data, restaurant data, and points of interest data 468 to the user's computing device 470, preferably a hand held network-connected mobile computing device with GPS capabilities. vActions process 460 also sends funds transfer data flow 472 to banking system 475, preferably using a secure channel such as an encrypted data stream. vActions process 460 also sends calendar data 478 to electronic calendar system 480 for updating the user's electronic calendar. vActions process 460 also sends automation settings 482 to the user's home automation system 485 to control household processes. vActions process 460 also sends home mail instructions 488 to the user's home mail office and parcel service providers 490. vActions process 460 also sends business mail instructions 492 to the company's mailroom 495. Finally, vActions process 460 sends phone configuration data 496 to the user's home and or business phone system 498 for configuring the user's phone.

Figure 5:
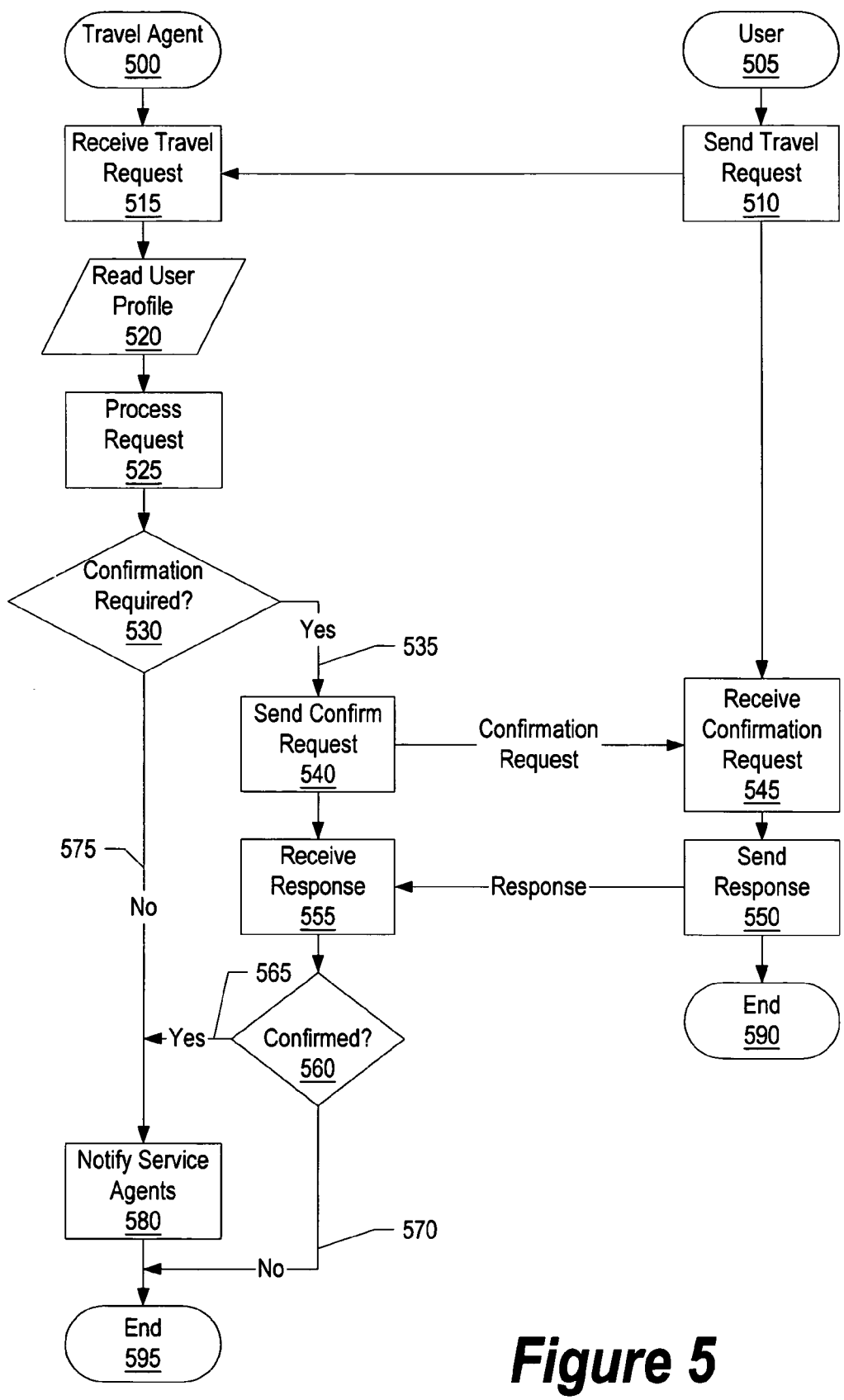
FIG. 5 is a flowchart for processing a user's travel request and notifying service agents.

FIG. 5 shows a flowchart for processing a user's travel request and notifying service agents. Travel agent processing commences at 500 and user processing commences at 505. The user sends a travel request to the travel agent (step 510).

The travel agent receives the user's travel request (step 515). The travel agent then retrieves and reads the user's travel profile information (input 520). The travel agent processes the user's travel request (step 525). Part of the user's travel profile includes whether the user wishes to confirm actions. If the user wishes to confirm actions, decision 530 branches to "yes" branch 535.

Following "yes" branch 535, the travel agent sends a confirmation request to the user (step 540). The user receives confirmation request (step 545) and sends a confirmation response (step 550). The travel agent receives the confirmation response (step 555) and determines whether the user confirmed the action. If the user confirmed the action, decision 560 branches to "yes" branch 565 whereupon the service agents are instructed to perform the preferred actions (step 580). The user can confirm some actions and decide to skip other options. In addition, the user can choose to have some actions automatically performed while other actions will require the user's confirmation before processing. On the other hand, if the user did not confirm the actions, decision 560 branches to "no" branch 570 and bypasses step 580 notifying the service providers.

The system can receive changes to the user's travel plans from a variety of sources. The user can phone his travel agent to make travel plans. The user can use a wireless communication device to indicate changes to his travel plans while traveling. In addition, the user can use a voice activated system that provides instructions to the automated travel agent concerning changes to the user's travel plans. Finally, the user can make travel changes using a network connected computing device to contact the travel agent and indicate the necessary changes. The ability to handle changes while the user is traveling keeps the user's travel data up to date and better serves both the user and the user's contacts.

Data transmitted between the user's computing device and any third party computing device, such as the travel agent, is preferably protected if such information contains any personal, confidential, or financial information. Information can be protected using public key/private key encryption as used in Secure Socket Layers (SSL) or using encryption using digital certificates.

If decision 530 does not require confirmation, "no" branch 575 is taken whereupon the service agents are instructed to perform the preferred actions (step 580). Once the user has established a profile (see FIGS. 1 and 2), the actions he wishes to have performed can be invoked automatically without any further need of user involvement. In this way, busy users do not need to concern themselves with these automated travel actions. After the service agents have been so notified, processing terminates at end 595.

Figure 6:
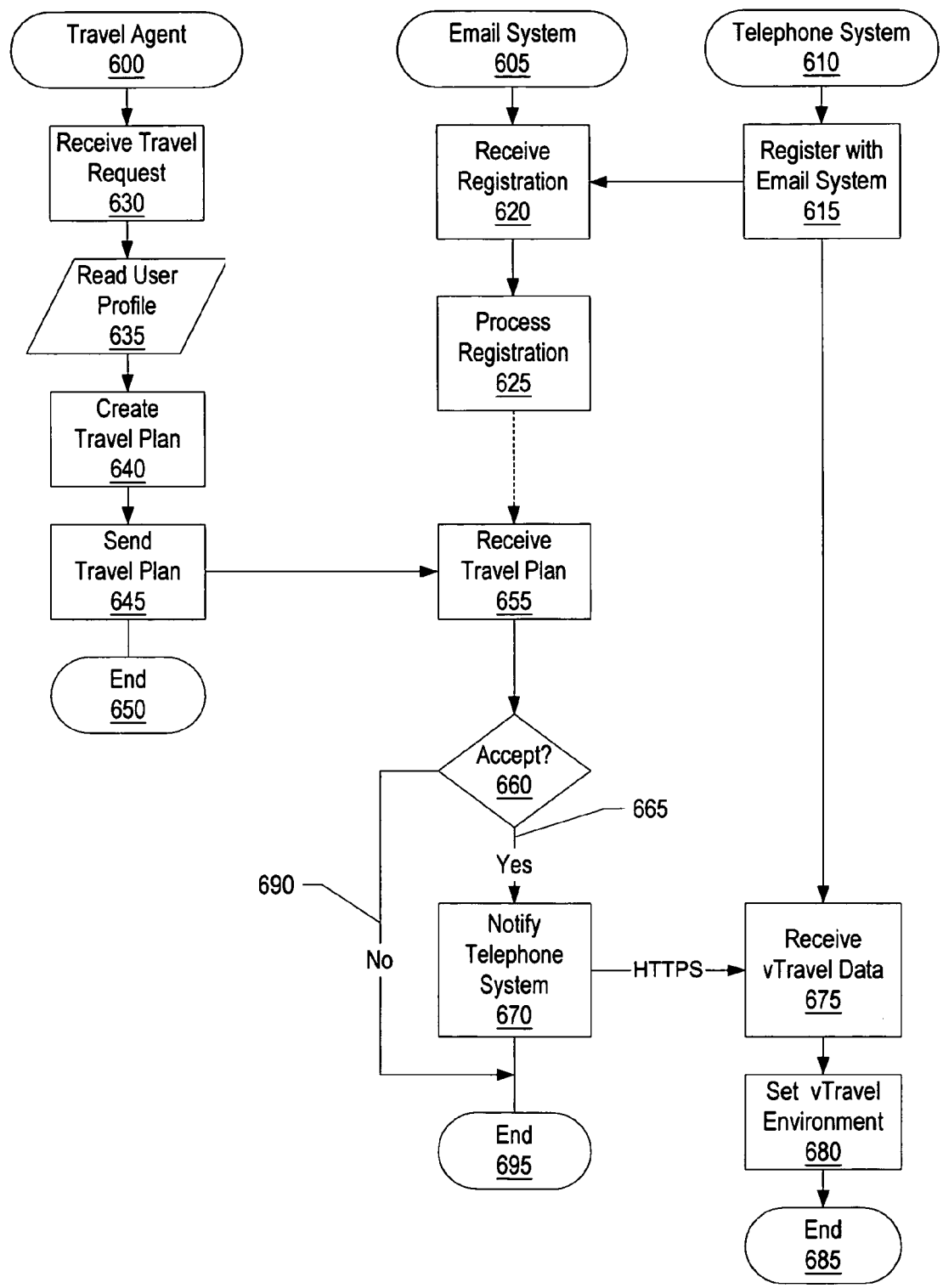
FIG. 6 is a flowchart for configuring a user's telephone in response to a user's travel plans and travel profile.

FIG. 6 shows a flowchart for configuring a user's telephone in response to a user's travel plans and travel profile. Travel agent processing commences at 600, the user's email system processing commences at 605, and telephone system processing commences at 610. Before the telephone system is automatically configurable, the telephone system registers with the user's email system (step 615). The user's email system receives the registration (step 620) and processes the registration, saving details regarding communication with the telephone system (step 625). Details include the address of the voice mail system and any password or security information needed to change voice mail settings. If the telephone system is a home answering machine, registration would include the phone number needed to contact the answering machine, access codes (i.e. a personal identification number entered from the telephone touch pad) needed to change answering machine settings, and configuration codes entered from the telephone touch pad used to select answering machine options, such as options to change the greeting message. Telephone system 610 may also be a PC based telephone system that receives phone calls using a modem connection and saves messages on nonvolatile storage, such as the hard drive, connected to the PC. A PC based telephone answering system may be more tightly coupled with an email system residing on the same PC, making configuration of the telephone answering system easier than remote systems such as voice mail systems and answering machines. The travel agent receives a travel request (step 630) and reads the user's travel profile information (input 635). The travel agent creates a travel plan (step 640) including actions the user prefers to execute while traveling. The travel plan is sent to the user's email system (step 645) before travel agent processing terminates at 650. The user's email system receives the travel plan and packaged actions from the travel agent (step 655).

Throughout this application, an email system is shown receiving messages from the travel agent and other systems for processing. While an email system is shown, any system capable of receiving data from a third party transmission and processing the data will meet the processing requirements. For example, a file transfer protocol (FTP) site can be set up on a PC that receives and processes files that are sent to the PC. An email example is used herein because, unlike FTP or other solutions, many PCs include an email application. Actions are included as attachments to an email message. These attachments are preferably encrypted and digitally signed. The message is digitally signed by encrypting the attachment using the sender's (i.e. the travel agent's) private key. Anyone can decipher the message using the sender's public key. A successful decipher of the message helps to guarantee that the sender is really who sent the message and not an imposter. The message is also encrypted using the receiver's (the user's PC) public key. Since the user is the only one with the corresponding private key, only the user's PC can decipher the message, thus keeping the message private from any potential eavesdroppers or interceptors. When an email with an attachment arrives, the PC detects the message and deciphers any attachments using both the sender's public key and the PC's own private key. If the attachment is successfully deciphered, the action enclosed in the attachment is performed, either immediately or after the user confirms that he wishes to execute the action.

The user decides whether to accept the actions (decision 660). If the user does not accept the action, "no" branch 690 is taken and email system processing ends at 695. On the other hand, if the actions are accepted, decision 660 branches to "yes" branch 665 which notifies the telephone system (step 670) using the pre-defined protocol established during telephone system registration (steps 615 to 625). The user's email system processing ends at 695. The telephone system receives the travel data instructions from an email system (step 675). These instructions are used to set the user's telephone to a travel environment (step 680). The travel environment is either configured and saved in the telephone system or the configuration data is sent from the email system to the telephone system using a secured transmission protocol (i.e. Secure-HTTP (HTTPS)). After the user's telephone has been set, telephone system processing terminates at 685.

Figure 7:
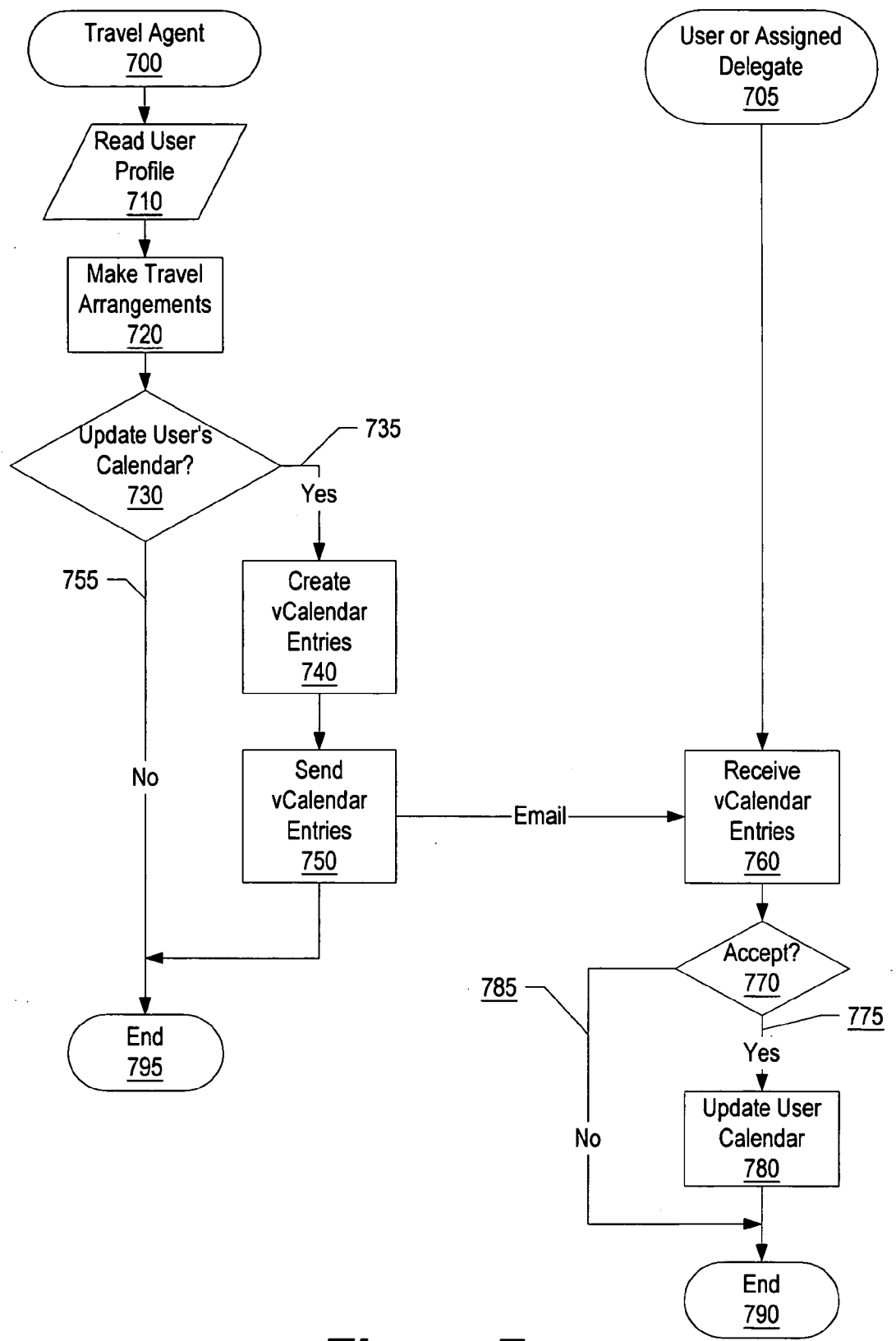
FIG. 7 is a flowchart for automatically updating a user's electronic calendar in response to a user's travel plans.

FIG. 7 shows a flowchart for automatically updating a user's electronic calendar in response to a user's travel plans. Travel agent processing commences at 700 and user or assigned delegate processing commences at 705. The user may specify a delegate to receive and accept calendar entries in the user's absence. For example, a user's secretary may receive and process calendar entries on behalf of the user.

Calendar processing commences with the travel agent processing a user's travel request. The user's travel profile is read (input 710) to determine whether automatic calendar entries are desired by the user. The travel agent then makes travel arrangements on behalf of the user (step 720) and saves the travel related information, such as hotel information, flight information, and rental car information. If the user does not desire automatic calendar entries, decision 730 branches to "no" branch 755 bypassing calendar entry steps and terminating calendar update processing at 795. On the other hand, if automatic calendar updating is preferred by the user, decision 730 branches to "yes" branch 735 whereupon calendar entries (called "vcalendar" entries) are created (step 740). The vCalendar entries are sent to the user or the user's assigned delegate (step 750) before travel agent processing of calendar entries terminates at 795. The user or assigned delegate receives the vCalendar entries in the form of an email or other data transmission (step 760). If the user requested (in the user's profile) that vCalendar entries be approved before updating the calendar, then the user reviews the calendar entries before they are used to update the user's electronic calendar. If the user accepts the calendar entries, or a subset thereof (decision 770), then "yes" branch 775 is taken whereupon the vCalendar entries are used to update the user's electronic calendar (step 780) before processing terminates at 790. On the other hand, if the user does not accept the calendar entries, "no" branch 785 is taken bypassing the calendar update step and processing terminates at end 790.

Figure 8:
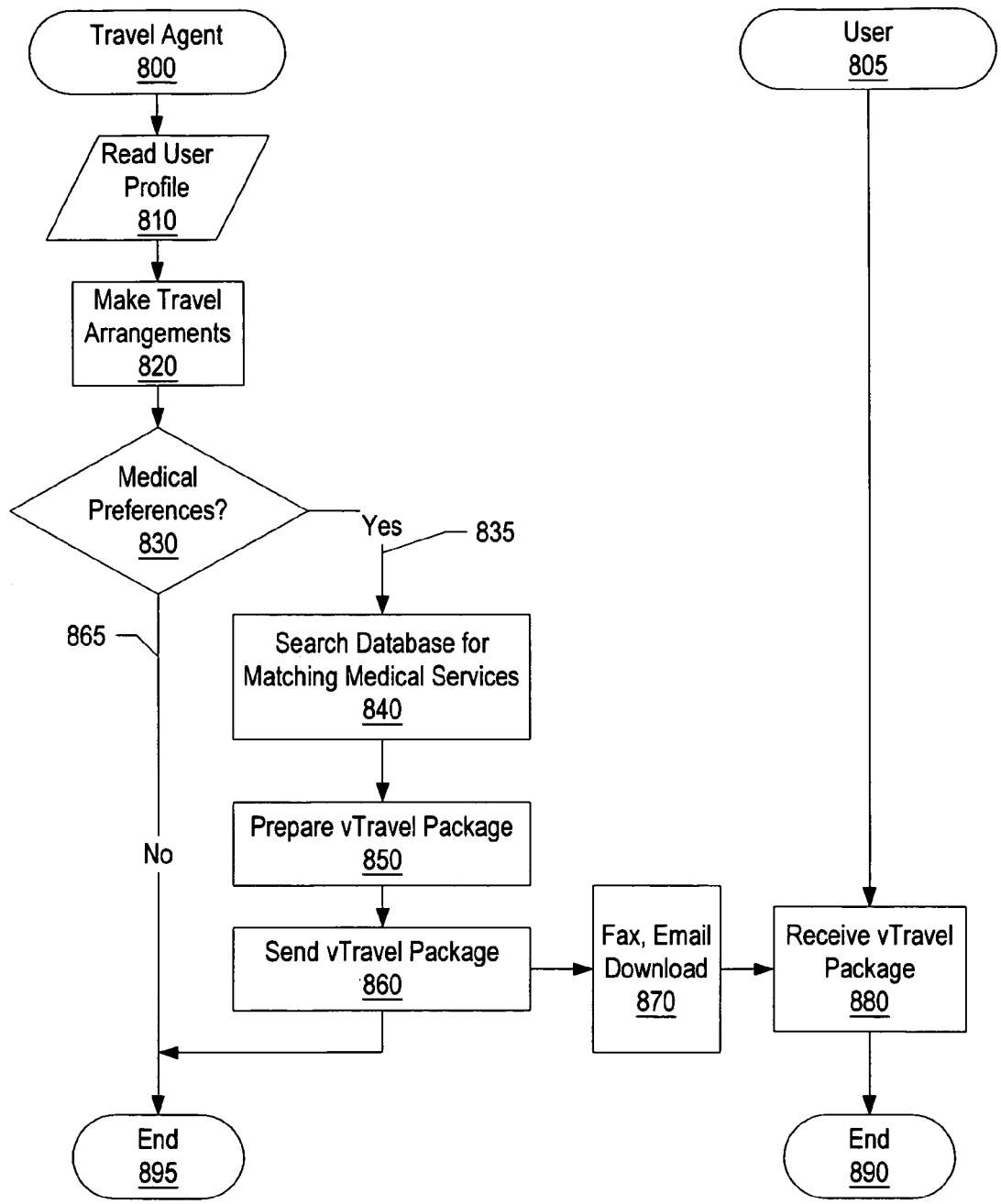
FIG. 8 is a flowchart for preparing and downloading emergency and medical information based on the user's profile and travel plans.

FIG. 8 shows a flowchart for preparing and downloading emergency and medical information based on the user's profile and travel plans. Travel agent processing commences at 800 and user processing commences at 805. Health processing commences with the travel agent processing a user's travel request. The user's travel profile is read (input 810) to determine whether health information is desired by the user. The travel agent then makes travel arrangements on behalf of the user (step 820) and saves the travel related information, such as hotel information, flight information, and rental car information. The travel agent also saves addresses related to the user's hotel and other travel destinations. If the user does not wish to receive health information, "no" branch 865 is taken and processing terminates at 895. On the other hand, if the user has selected medical preferences, such as insurance company providers, preferred hospitals, request for emergency/health information, etc., decision 830 branches to "yes" branch 835. The travel agent uses the user's destination address(es) and health provider preferences and matches these against a medical services database to identify health providers near in proximity to the user's travel destinations and that match the user's health criteria, such as acceptance of a particular health insurance plan. This identification is used to prepare a travel package containing the identified health information (step 850). After the travel package has been prepared, it is sent to the user (step 860) before travel agent processing terminates at 895.

The sent travel package can be emailed, faxed, or downloaded to the user (step 870). The user receives the travel package data (step 880). Preferably, the travel package data includes GPS coordinate data to be used by a user's GPS device to direct the user towards the closest medical provider and provide the user with directions to such provider. After the travel package has been received by the user it is available for use by the user during the user's travels. The user processing then terminates at 890.

Figure 9:
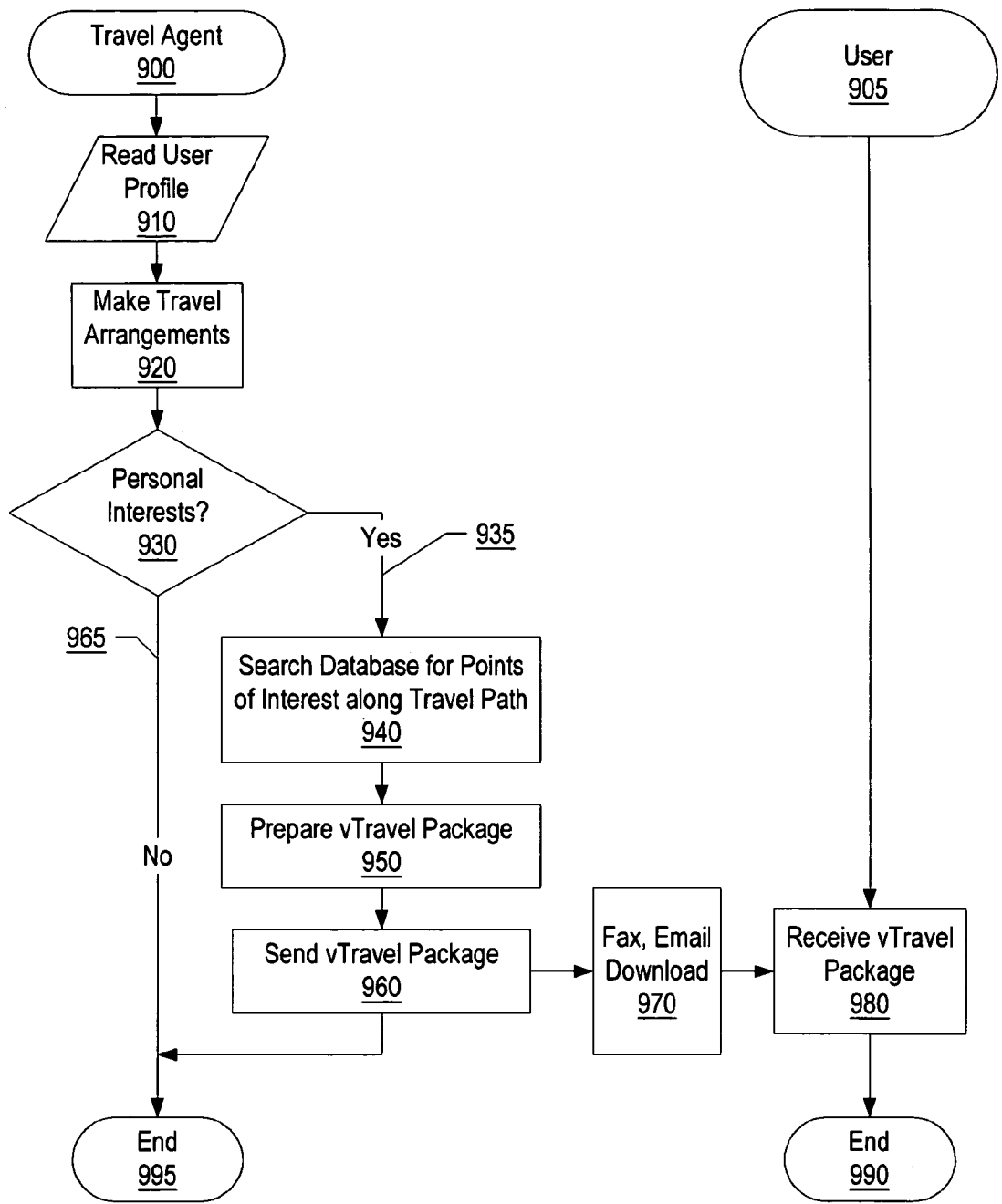
FIG. 9 is a flowchart for preparing and downloading personal interest information based on the user's profile and travel plans.

FIG. 9 shows a flowchart for preparing and downloading personal interest information based on the user's profile and travel plans. Travel agent processing commences at 900 and user processing commences at 905. Point of interest processing commences with the travel agent processing a user's travel request. The user's travel profile is read (input 910) to determine whether civic/cultural events and attraction information is desired by the user. The travel agent then makes travel arrangements on behalf of the user (step 920) and saves the travel related information, such as hotel information, flight information, and rental car information. The travel agent also saves addresses related to the user's hotel and other travel destinations. If the user does not wish to receive civic/cultural events and attraction information, "no" branch is taken and processing terminates at 995. On the other hand, if the user has requested civic/cultural events and attraction information, decision 930 branches to "yes" branch 935. The travel agent uses the user's destination address(es) and civic/cultural events and attraction preferences and matches these against a civic/cultural events and attraction information database to identify civic/cultural events and attraction information near in proximity to the user's travel destinations and that match the user's civic/cultural events and attraction preferences, such as interest in opera or museums. This identification is used to prepare a travel package containing the identified civic/cultural events and attraction information (step 950). After the travel package has been prepared, it is sent to the user (step 960) before travel agent processing terminates at 995.

The sent travel package can be emailed, faxed, or downloaded to the user (step 970). The user receives the travel package data (step 980). Preferably, the travel package data includes GPS coordinate data to be used by a user's GPS device to direct the user towards the desired civic/cultural event, or attraction and provides the user with directions to such event or attraction. After the travel package has been received by the user it is available for use by the user during the user's travels. The user processing then terminates at 990.

Figure 10:
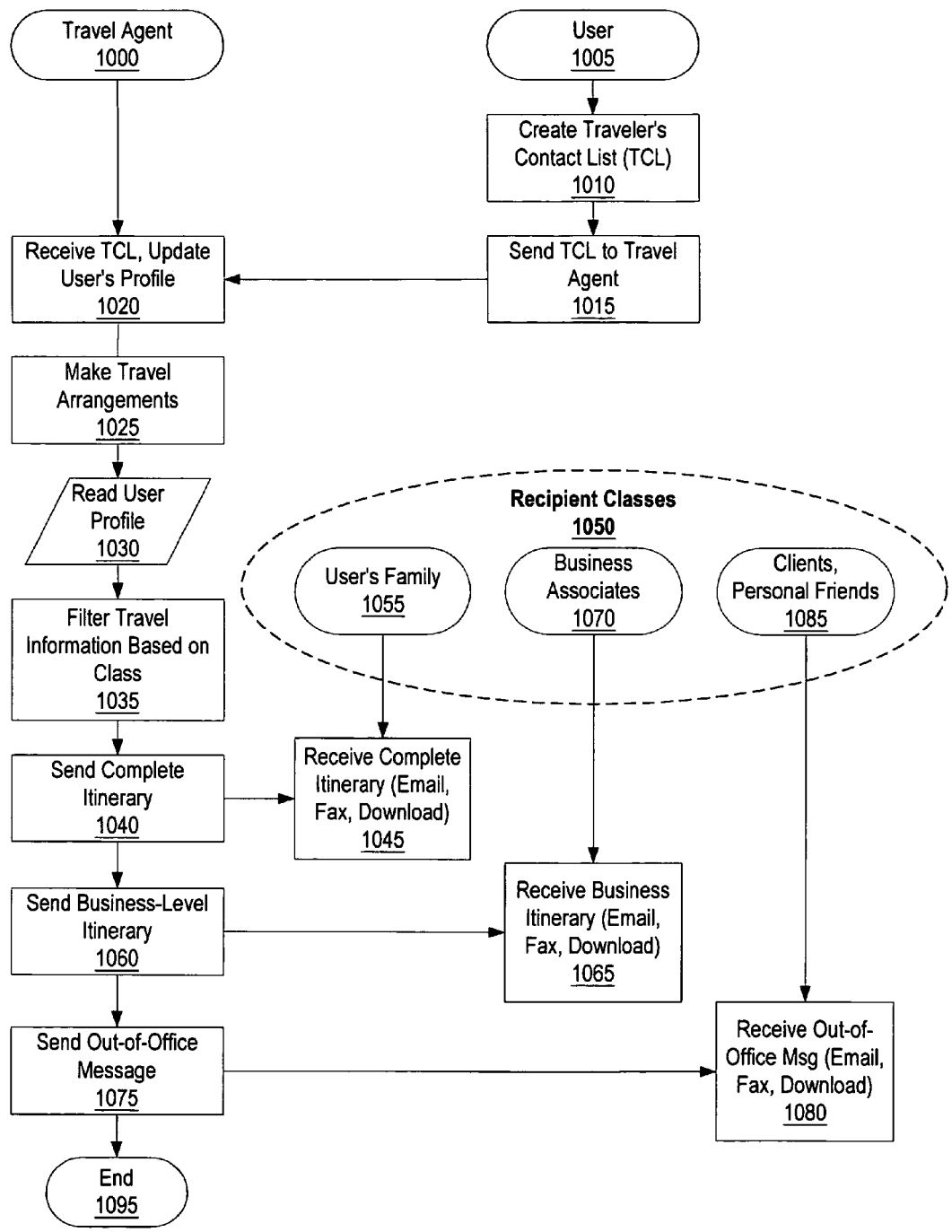
FIG. 10 is a flowchart for notifying various classes of people in the user's contact list regarding the user's travel plans.

FIG. 10 shows a flowchart for notifying various classes of people in the user's contact list regarding the user's travel plans. Travel agent processing commences at 1000 and user processing commences at 1005. The user creates one or more traveler's contact lists (TCLs) that are used to inform others that the user is out of the office (step 1010). TCLs are similar to distribution lists and contain contact information, such as email addresses, for people the user would like to contact. TCLs may be made from scratch or may be created from existing contact information contained in the user's personal information manager (PIM), electronic address book, or company maintained email lists. Once the TCLs have been created, they are sent to the travel agent (step 1015) to be stored with the user's travel profile information. The travel agent receives the TCLs from the user and updates the user's profile using the TCL information (step 1020). The travel agent then receives travel instructions for the user's next travel plan and makes the corresponding travel arrangements (step 1025). The travel agent reads the user's profile including the user's desire to send travel information to various contacts (input 1030). The travel information pertaining to the user's scheduled trip is filtered based upon the recipient class (step 1035). For example, the user's spouse and secretary may be sent complete travel details (step 1040). This information is in turn received (step 1045) by the user's family recipient class (class 1055). Certain business associates of the user are sent business-level itinerary information (step 1060), for example the name of the conference that the user is attending, but not the specific hotel and flight information. This information is in turn received (step 1065) by the user's business associates (class 1070) who are included in the user's business-level TCL. Finally, an "out of office" message is sent (step 1075) to clients and other individuals that may need to know whether the user is available (and the user's backup) but do not need to know the user's travel plans. This information is in turn received (step 1080) by the user's clients and other friends (class 1085) who are included in the user's non-business level TCL. After the various classes of messages have been sent, processing terminates at 1095.

Figure 11:
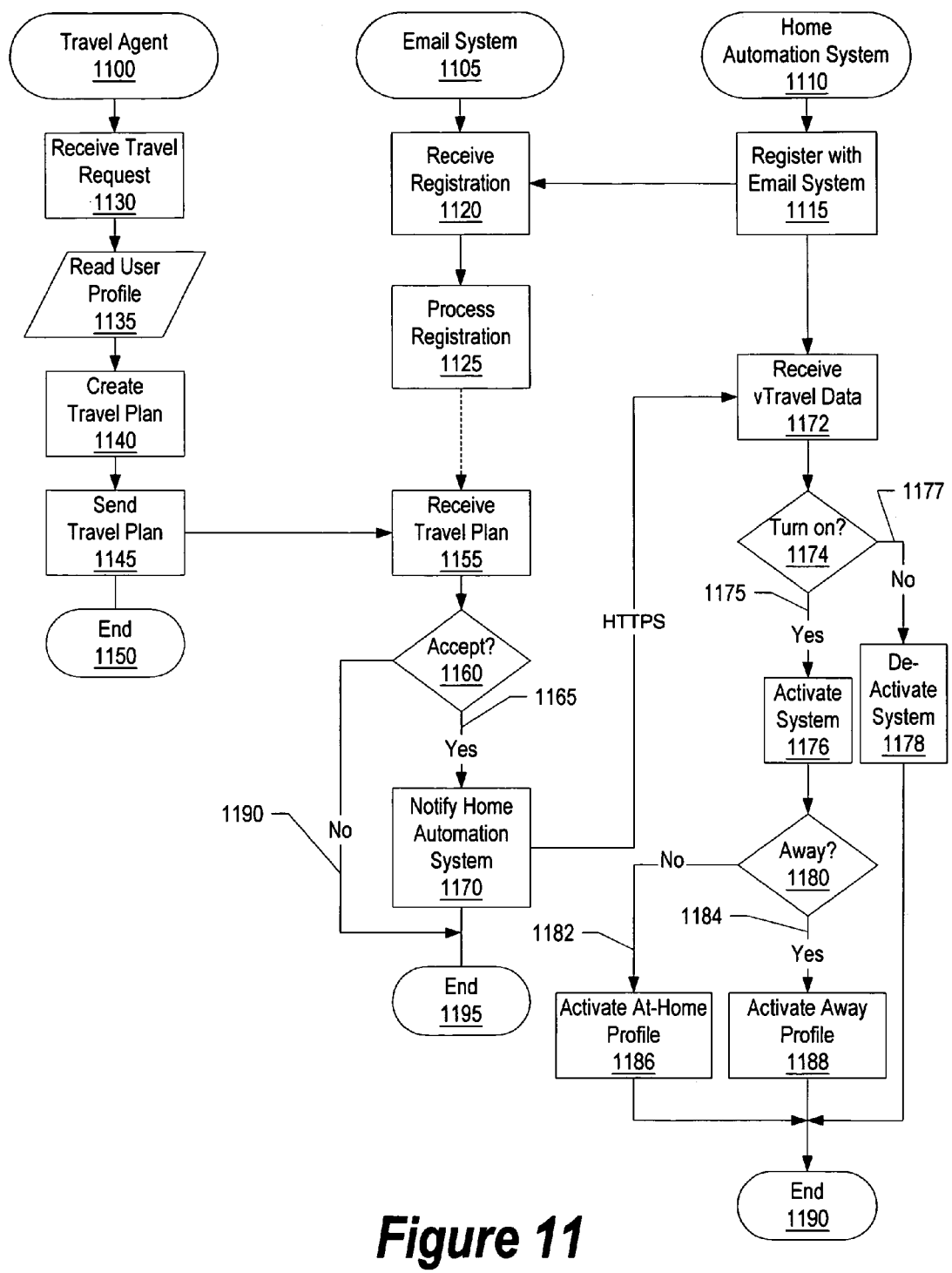
FIG. 11 is a flowchart for configuring a user's home automation system based on the user's profile and travel plans.

FIG. 11 shows a flowchart for configuring a user's home automation system based on the user's profile and travel plans. Travel agent processing commences at 1100, email system processing commences at 1105, and home automation processing commences at 1110. The home automation system registers with the email system (step 1115) providing the email system with an address and other information about the home automation system. The email system receives the home automation system registration (step 1120) and processes the registration (step 1125) by setting configuration settings and other values associated with contacting and instructing the home automation system. When the travel agent receives a travel request (step 1130) it reads the user's travel profile (input 1135) to determine whether the user desires that home automation settings be automatically configured when the user is away. If the user desires automatic home automation settings, the travel agent creates a travel plan (step 1140) that includes the user's desired home automation profile. The travel plan is then sent (step 1145) to the user's email system for further processing before travel agent processing terminates at 1150. The user's email system receives the travel plan (step 1155) that includes home automation actions. If the user has chosen to manually accept actions, decision 1160 is processed by receiving a confirmation from the user. If the user accepts (or if the user has chosen to have the actions processed without manual confirmation), "yes" branch 1165 is taken and a message notifying the home automation system is prepared and sent (step 1170). On the other hand, if the user does not accept the home automation action, "no" branch 1190 is taken. Email system processing terminates at 1195.

Home automation system 1110 receives the home automation instructions from the user's email system (step 1172). For security reasons, the data is sent using a secure protocol, such as an encrypted message or using a secure-HTTP (HTTPS) protocol. The home automation system may reside on the user's PC or may be a separate home automation device that is sent instructions from a PC or telephone. The PC or home automation device contains profiles that can be activated remotely using a password or personal identification number (PIN). If the email system and the home automation device reside on the same PC or on the same secured local area network (LAN), then the email system can receive the attachment containing the home automation action and process it accordingly. If, however, the email system is remote from the home automation system, then the PC running the email system contacts the home automation system using a secure link. The secure link can be using encrypted messages much like the way the email system receives attachments (see FIG. 6), or may be a telephone connection that is placed to the home automation system whereby the home automation PIN code is entered and the necessary touch tone signals are delivered to activate the desired profile. The home automation system can be activated remotely by the email system. The action may request that the home automation system turn itself on. Decision 1174 determines whether the system should turn on. If it should turn on, "yes" branch 1175 is taken whereupon the system is activated if the system is not already activated (step 1176). If the system is being requested to turn off, "no" branch 1177 is taken whereupon the system is deactivated (step 1178). In this manner, the home automation system can be remotely activated in case the user had to travel suddenly and did not have the opportunity to turn the home automation system on manually before leaving his home.

The home automation system may receive a simple command instructing the system to enter an "at-home" or "away" configuration or may receive more complicated instructions identifying particular home automation functions to perform. Using a simple example, if the home automation system is instructed to enter an "away" configuration, decision 1180 branches to "yes" branch 1184 whereupon the home automation system activates the travel environment profile (step 1188). On the other hand, if the home automation system is instructed to enter an "at home" configuration, decision 1180 branches to "no" branch 1182 whereupon the home automation system activates the at-home environment profile (step 1186). After the home automation environment has been set, home automation terminates at 1190 until further instructions are received. The system automatically returns to the home profile setting when the user's trip is completed as indicated by the travel end date.

Figure 12:
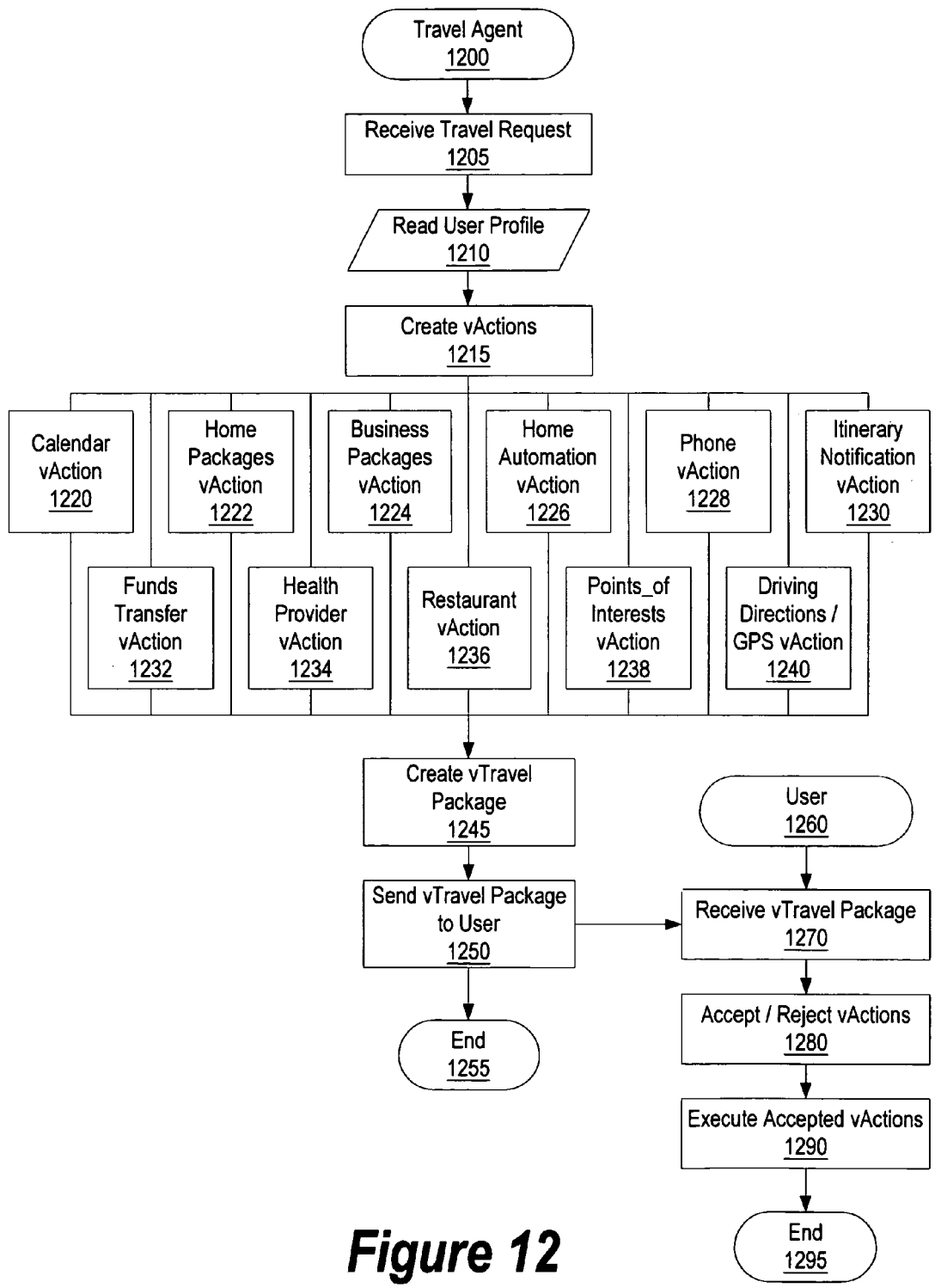
FIG. 12 is a flowchart for preparing and packaging actions and sending packaged actions to the user for confirmation.

FIG. 12 shows a flowchart for preparing and packaging actions and sending packaged actions to the user for confirmation. Travel agent processing commences at 1200 whereupon a travel request is received (step 1205), typically from the user. The travel agent reads the user profile (input 1210) to determine which actions the user wishes to have performed when the user is traveling. Based on the profile information, the travel agent creates a variety of actions (vActions)(step 1215). If the user desires to have his electronic calendar updated, the system creates a calendar vAction (step 1220). If the user desires to have his home packages handled, the system creates a home packages vAction (step 1222). If the user desires to have his business packages handled, the system creates a business packages vAction (step 1224). If the user desires to have his home automation system automatically configured, the system creates a home automation vAction (step 1226). If the user desires to have his telephone configured, the system creates a telephone vAction (step 1228). If the user desires to have contacts informed that the user is away from the office, the system creates an itinerary notification vAction (step 1230). If the user desires to have funds transferred to his electronic wallet or debit card, the system creates a funds transfer vAction (step 1232). If the user desires to receive health provider information pertaining to the user's travel destination, the system creates a health provider vAction (step 1234). If the user desires restaurant information pertaining to the user's travel destination, the system creates a restaurant vAction (step 1236). If the user desires to receive points of interests regarding cultural events, civic events, and area attractions pertaining to the user's travel destination, the system creates a points-of-interest vAction (step 1238). Finally, if the user desires driving directions and GPS data corresponding with the user's travel destination, the system creates a driving directions/GPS vAction (step 1240).

The vActions that are created are packaged together for transmission to the user (step 1245). The packaged vActions are transmitted to the user (step 1250) before travel agent processing terminates at 1255. User processing commences at 1260 whereupon the user receives the travel package (step 1270). The user optionally accepts or rejects the various vActions included in the package (step 1280). The accepted vActions are then executed at the appropriate time (step 1290) to facilitate the user's travel desires before user processing is terminated at 1295.

FIGS. 1-12, described above, show various ways of performing travel related actions on behalf of a user. In one embodiment, the user's calendar is used to receive travel related information for keeping the user and others informed regarding the user's travel plans. As described in FIGS. 1-12, the actual travel reservations can be made by any travel agent (i.e. an automated travel agent, a traditional human travel agent, etc.). FIGS. 13-20, described below, show an example of optimizing travel reservations. One way travel reservations are optimized, as explained in further detail below, is by using the user's calendar system to request travel reservations and then using a computer system to receive and optimize possible travel plans based upon user preferences (i.e. minimizing travel costs).

Figure 13:
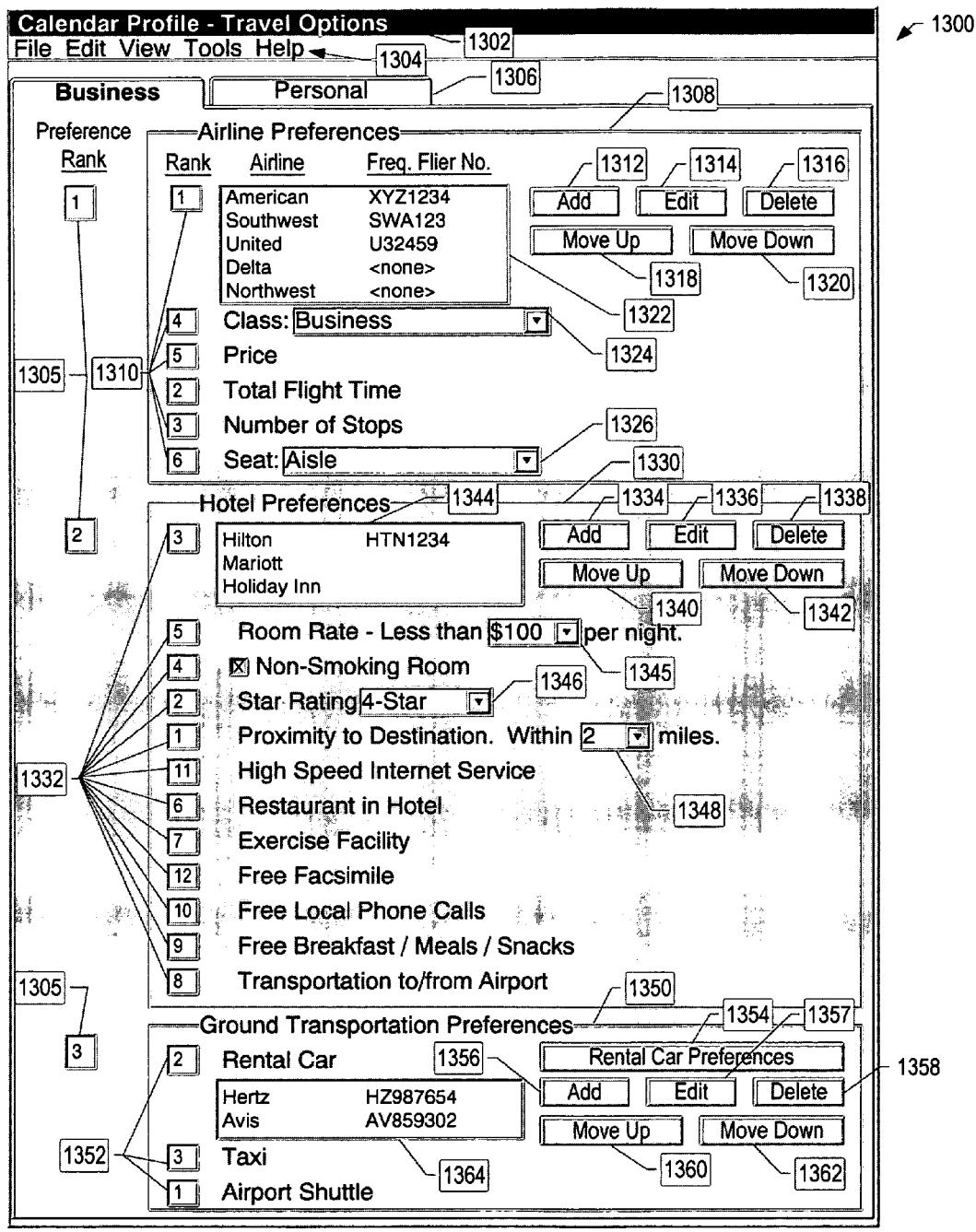
FIG. 13 is a travel profile screen for selecting travel options.

FIG. 13 shows travel profile screen 1300 used for selecting travel options by a user. Travel profile screen 1300 includes title bar 1302 and menu bar 1304. Menu bar 1304 includes a "File" menu option which would further include the ability to add a new profile to the calendar, the ability to delete an existing profile, and the ability to copy profile data to another profile for further optimization and processing. Tabbed dialogs 1306 include preferences for business and personal travel. When the user is traveling for business, a faster flight may be more important than a lower airfare. Conversely, when making personal travel plans, the lowest airfare may be more important than arriving at a particular time. In addition, as will be explained further below, the business travel may be tied to a set of business policies and rules that do not apply when the user is paying for the travel out of his own pocket. Additional tabbed dialogs can be included for other types of travel, such as preferences when traveling with children. Preference ranking 1305 allows the user to rank the importance of general travel categories. The general travel categories shown include airline preferences 1308, hotel preferences 1330, and ground transportation preferences 1350. Preference ranking 1305 shows that airline preferences 1308 rank ahead of hotel preferences 1330 and ground transportation preferences 1350.

Preference ranking 1305 further shows that hotel ranking 1330 ranks ahead of ground transportation preferences 1350. Rankings are further made for preferences within categories. Airline preference rankings 1310 allows the user to rank the choices within airline preferences 1308. Hotel preference rankings 1332 allows the user to rank the choices within hotel preferences 1330, and ground transportation preference rankings 1352 allows the user to rank the choices within ground transportation preferences 1350.

Airline preferences 1308 includes airline list 1322 which allows the user to order the airlines by preference. Frequent flier information is also listed for programs in which the user is enrolled. Add command button 1312 allows the user to add a new airline to airline list 1322. Edit command button 1314 allows the user to edit an existing airline, for example by adding a newly obtained frequent flier number. Delete command button 1316 allows the user to delete an airline from airline list 1322. Move up command button 1318 allows the user to select an airline within airline list 1322 and move the airline up in the user's preference order. Each time move up command button 1318 is pressed the airline moves up one place in airline list 1322. On the other hand, each time move down command button 1320 is pressed, the airline that has been selected moves down one position. Airline class drop down box 1324 allows the user to select his preferred class for flying.

The user may select "business" class for business travel tabbed dialog 1306 and "coach" class for personal travel tabbed dialog 1306. Seat preference drop down box 1326 allows the user to specify the type of seat preferred by the user (i.e. "aisle," "window," etc.). Airline preferences 1308 also includes price, total flight time, and number of stops. Airline preference rankings 1310 allow the user to assign the level of importance to items within airline preferences 1308 (i.e. airline, travel class, price, total flight time, number of stops, and type of seat).

Hotel preferences 1330 includes hotel list 1344 which allows the user to order the hotels by preference. Frequent guest information is also listed for hotels in which the user is enrolled. Add command button 1334 allows the user to add a new hotel to hotel list 1344. Edit command button 1336 allows the user to edit an existing hotel, for example by adding a newly obtained frequent guest number. Delete command button 1338 allows the user to delete a hotel from hotel list 1344. Move up command button 1340 allows the user to select an hotel within hotel list 1344 and move the hotel up in the user's preference order. Each time move up command button 1340 is pressed the hotel moves up one place in hotel list 1344. On the other hand, each time move down command button 1342 is pressed, the hotel that has been selected moves down one position. Maximum hotel room rate drop down box 1345 allows the user to select a preferred maximum amount he is willing to spend on a hotel room per night. Hotel star rating drop down box 1346 allows the user to select his preferred quality rating for hotels. The user may select "4-Star" hotels for business travel tabbed dialog 1306 and "2-Star" hotels for personal travel tabbed dialog 1306. Proximity drop down box 1348 allows the user to specify the distance the hotel should be from the destination. When entering the trip information, the user enters a destination address and indicates whether the destination is a conference. If the destination is a conference, conference information is provided using the "Tools" option under menu 1304 in order to search conference pricing which is often discounted for staying at a particular hotel, flying on a particular airline, and/or obtaining certain ground transportation. Hotel preference rankings 1332 allow the user to assign the level of importance to items within hotel preferences 1330 (i.e. hotel chain, room rate, non-smoking room preference, star rating, proximity preference, high speed Internet service, hotel restaurant, workout facility, complimentary facsimile service, complimentary local phone calls, complimentary breakfast or other meals, and transportation to and from the airport). Other hotel options, such as size of bed preference, can also be included within hotel preferences 1330.

Ground transportation preferences 1350 include rental car list 1364 which allows the user to order rental car providers by preference. Rental car member numbers are also listed for rental car companies with which the user is enrolled. Add command button 1356 allows the user to add a new rental car company to rental car list 1364. Edit command button 1357 allows the user to edit an existing rental car company, for example by adding a newly obtained rental car member number. Delete command button 1358 allows the user to delete a rental car company from rental car list 1364. Move up command button 1360 allows the user to select a rental car company within rental car list 1364 and move the rental car company up in the user's preference order. Each time move up command button 1360 is pressed the rental car company moves up one place in rental car list 1364. On the other hand, each time move down command button 1362 is pressed, the rental car company that has been selected moves down one position. Rental car preferences command button 1354 opens a separate window allowing the user to specify rental car preferences (type and model of car, price limit, etc.). Ground transportation preference rankings 1352 allow the user to assign the level of importance to items within ground transportation preferences 1350 (i.e. rental car, taxi, airport shuttle). Note that unlike the preference rankings for hotels and airlines, ground transportation preference rankings 1352 are mutually exclusive because a user would not want more than one ground transportation selection.

Figure 14:
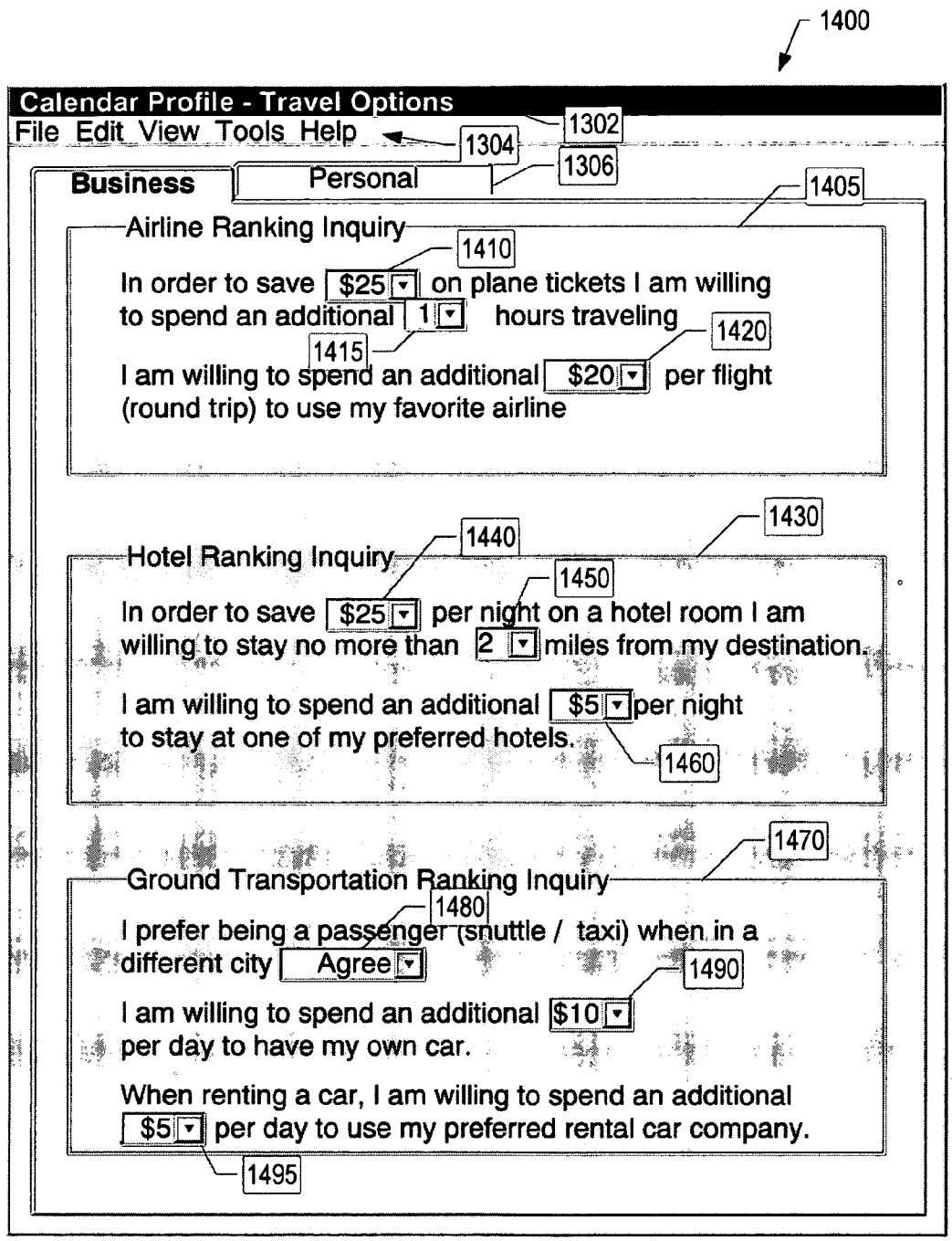
FIG. 14 is a travel ranking screen for assisting the user in ranking travel options.

FIG. 14 shows travel ranking screen 1400 for assisting the user in ranking travel options. To seed the ranking values found in FIG. 13, the user opens travel ranking screen 1400. Travel ranking screen 1400 includes title bar 1302, menu bar 1304, and dialog tabs 1306 also found in calendar profile screen 1300 (see FIG. 13). Travel ranking screen 1300 is divided between airline ranking inquiry frame 1405, hotel ranking inquiry frame 1430, and ground transportation ranking frame 1470.

Airline ranking inquiry frame 1405 includes questions designed to determine the value of the user's time and the user's threshold for paying for desired air related services. Combo box 1410 is selected by the user to provide the user's willingness in terms of monetary savings in exchange for longer flight times. Combo box 1415 is selected by the user to provide the user's willingness in terms of time to wait in exchange for less expensive flights. The lower the monetary value entered in combo box 1410 in comparison to higher time values entered in combo box 1415, the more price factors from FIG. 13 are weighted in importance. Conversely, the higher the monetary value entered in combo box 1410 in comparison to lower time values entered in combo box 1415, the less price factors from FIG. 13 are weighted in importance and the more flight time is weighted in importance. Combo box 1420 provides the user to enter a monetary value for flying a preferred airline. Many users are frequent fliers with certain airlines and receive rewards, in terms of free flights and flight upgrades, for flying more miles with a particular airline. Combo box 1420 allows the user to indicate whether he is willing to pay more for flying a preferred airline rather than a non-preferred airline with the decision often revolving around the user's desire to add to his frequent flier miles. The questions presented in airline ranking inquiry frame 1405 are examples in obtaining data to set rank values for air travel preferences. Additional questions could be posed to determine the importance to the user of the class of flight, the number of stops (somewhat related to total flying time), and the seat position.

Hotel ranking inquiry frame 1430 includes questions designed to determine the value of the user's convenience and the user's threshold for paying more for preferred hotels. Combo box 1440 is selected by the user to provide the user's willingness in terms of monetary savings in exchange for longer driving distances to his destination. Combo box 1450 is selected by the user to provide the user's willingness in terms of distance to travel in exchange for lower room rates. The lower the monetary value entered in combo box 1440 in comparison to higher distance values entered in combo box 1450, the more price factors from FIG. 13 are weighted in importance. Conversely, the higher the monetary value entered in combo box 1440 in comparison to lower distance values entered in combo box 1450, the less price factors from FIG. 13 are weighted in importance and the more convenience factors are weighted in importance. Combo box 1460 allows the user to enter a monetary value for staying at a preferred hotel. Frequent travelers may receive rewards for staying at a particular hotel or simply enjoy a hotel chain more than others due to amenities or services provided at the particular hotel. Combo box 1460 allows the user to indicate whether he is willing to pay more for staying at a preferred hotel rather than at a non-preferred hotel. The questions presented in hotel ranking inquiry frame 1430 are examples in obtaining data to set rank values for hotel preferences, additional questions could be posed to determine the importance to the user of other factors shown in FIG. 13 when selecting a hotel room.

Ground transportation ranking inquiry frame 1470 includes questions designed to determine the user's preferred method of travel in foreign cities and the value the user places in having his own rental car while traveling. Ground transportation ranking inquiry frame 1470 also determines the strength of the user's rental car company preference when renting a car. Combo box 1480 is selected by the user to determine whether the user prefers being driven by a taxi or shuttle while in a foreign city or prefers driving himself. If the user selects "Agrees" from combo box 1480 then rental car options are ranked lower than taxi and shuttle options. On the other hand, if the user selects "Disagree," then rental car options are ranked higher than taxi and shuttle options. Combo box 1490 provides the user's willingness to pay more for ground transportation in exchange for the convenience of having his own car. Combo box 1495 allows the user to enter a monetary value for using a preferred rental car company. Frequent travelers may receive rewards for using a particular rental car company or may simply prefer a rental car company because of services or features provided by the particular company. Combo box 1495 allows the user to indicate whether he is willing to pay more for using a preferred rental car company. The questions presented in ground transportation ranking inquiry frame 1470 are examples in obtaining data to set rank values for ground transportation preferences, additional questions could be posed to determine the importance to the user of other ground transportation factors.

Figure 15:
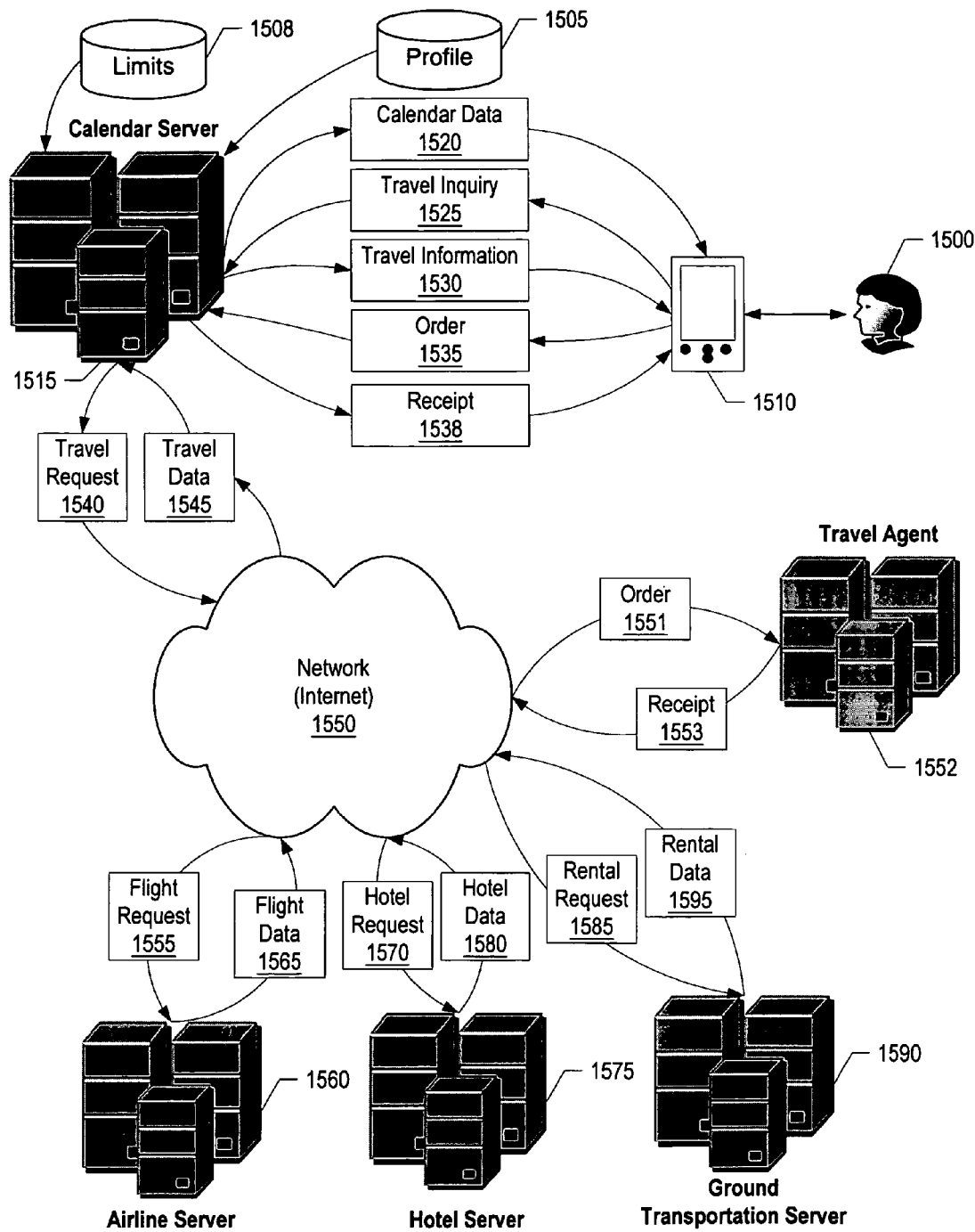
FIG. 15 is a network diagram of optimizing travel plans using a calendar server and service agents.

FIG. 15 is a network diagram of optimizing travel plans using calendar server 1515 and various travel service agents. Calendar data 1520 is transmitted from calendar server 1515 to pervasive computing device 1510 where it can be viewed and modified by user 1500. User 1500 requests travel information by selecting a destination and travel dates using pervasive computing device 1510. Pervasive computing device 1510 may be a handheld wireless computing device, a traditional laptop or desktop computer system, or an advanced mobile telephone device that includes a calendaring or travel application. Once user 1500 has selected a travel destination and travel dates, calendar travel inquiry 1525 is sent to calendar server 1515 for storing in the user's calendar data area and for processing the user's travel request. Calendar server 1515 may be an internal calendar server, such as a Lotus Notes™ server, a networked calendar server such as an Internet portal calendar offering (i.e. Yahoo calendar), or an electronic calendar program operated on user 1500's computer system (i.e. Microsoft Outlook™ operating on user 1500's desktop computer system). Calendar server 1515 and pervasive computing device 1510 may be a common computing device or may be separate computing devices. When pervasive computing device 1510 and calendar server 1515 are separate computing devices, communication between the devices may be facilitated using wireless communication, telephone line-based communication, Internet communication, a combination of wireless, wired, and Internet communication, or any other means of transmitting data between computing devices.

Calendar server 1515 reads user's profile 1505 to determine the user's travel preferences. If the user is planning a business trip, calendar server reads company rules and limits file 1508 which may dictate the spending limits for various travel options and may provide rules requiring the user to take the least expensive travel options available. Calendar server 1515 sends travel request 1540 to computer network 1550 to receive information from various service providers. In one embodiment, computer network 1550 includes the Internet. Flight request component 1555 of travel request 1540 is received by airline server 1560 and corresponding flight data 1565 is returned to calendar server 1515. Airline server may include several servers for several airlines and may also include air travel databases, such as Expedia™, that provide information regarding multiple airlines. Likewise, hotel request 1570 is received by hotel server 1575 and corresponding hotel information 1580 is returned to calendar server 1515. Again, hotel server may include multiple servers representing individual hotel companies as well as hotel databases that include hotel information regarding many different hotels. Likewise, ground transportation request 1585 is received by ground transportation servers 1590 and corresponding ground transportation information 1595 is returned to calendar server 1515. Again, ground transportation server may include multiple servers representing individual rental car companies, taxi services, and shuttle services as well as ground transportation databases that include ground transportation information regarding many different ground transportation options.

Calendar server 1515 gathers returned travel data 1545 and prepares one or more travel package options for the user. Calendar server 1515 also optimizes the available travel options in light of company rules or limits 1508 and user's travel profile 1505. This travel information 1530 is sent to the user's pervasive computing device 1510 via an email or a link to the user's electronic calendar. As travel data changes, calendar server 1515 may continue to send travel requests 1540 and receive further travel data 1545 with updated pricing and availability for travel components.

When the user is ready to book one or more of the components offered by a service provider and packaged by calendar server 1515, he sends order 1535 corresponding to the travel service(s) he wishes to book. Order 1551 is sent to travel agent 1552 for purchasing the travel service. While communication is shown flowing between the user, the calendar server, and the travel agent, it is also possible for user 1500 to contact travel agent 1552 using a wired, wireless, or Internet connection. In addition, while a travel agent is shown, the user could purchase the travel service directly from the service provider (i.e. directly from an airline or hotel). Travel agent may be a traditional travel agent with human operators or may be an online Internet-based travel agent (i.e. Expedia™) that allows users to book travel using a credit card. Connections between pervasive computing device 1510 and travel agent 1552 are preferably encrypted to prevent third parties from intercepting personal and/or financial data concerning the user. Travel agent 1552 processes the transactions and prepares receipt 1553 which is transmitted to pervasive computing device (as receipt 1538). The receipt will include itinerary related information for the user's reference. The user can continue to order travel components until all travel related services have been purchased. In addition, calendar server continues to provide user 1500 with updated travel options. If better or less expensive options become available, user 1500 can cancel previously booked travel options and obtain the better or less expensive options.

Figure 16:
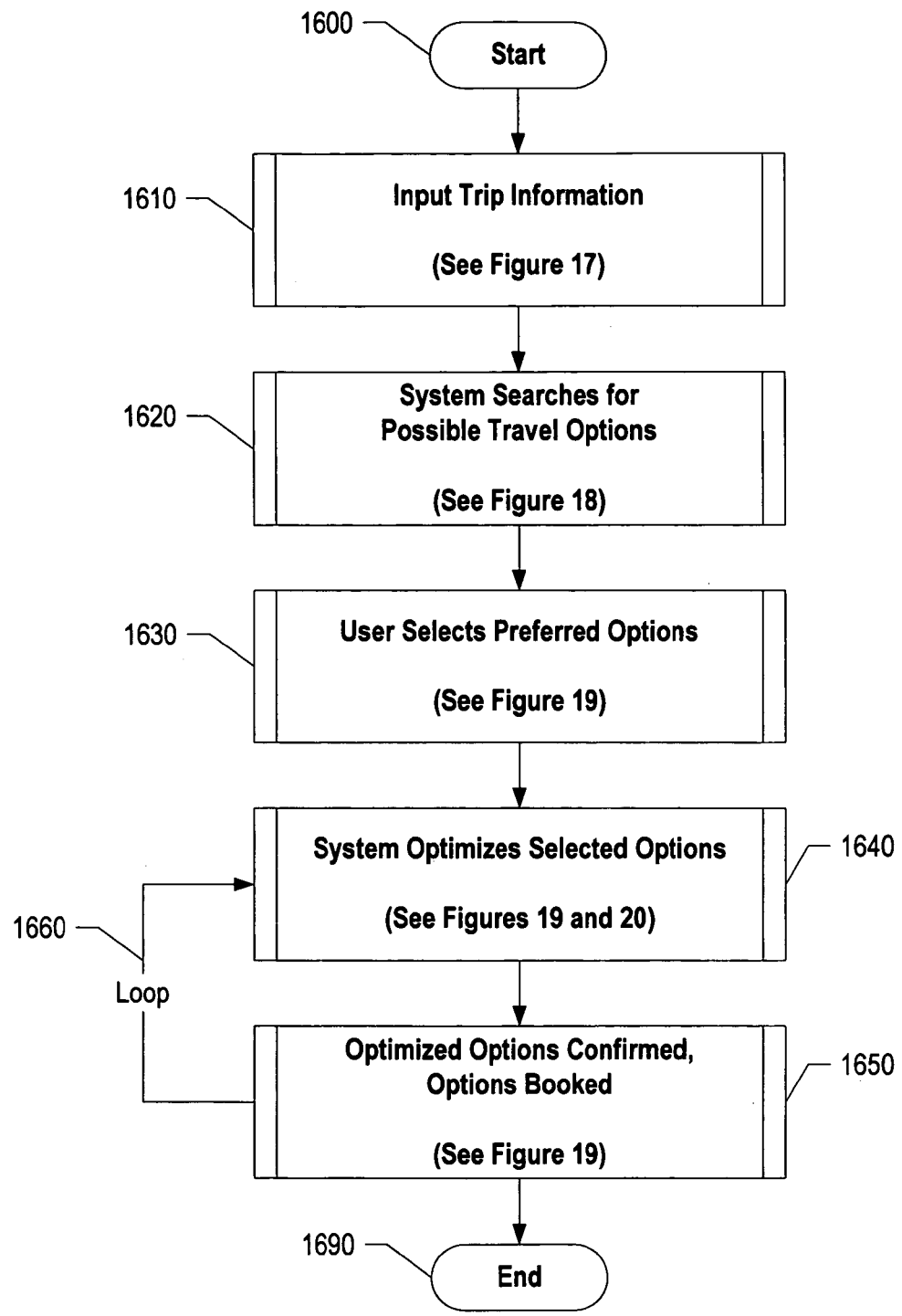
FIG. 16 is a high level flowchart for optimizing travel plans using a calendar server and service agents.

FIG. 16 shows a high level flowchart for optimizing travel plans using a calendar server and service agents. Processing commences at 1600 whereupon the user inputs (predefined process 1610) trip information such as the dates of the trip and the destination (see FIG. 17 for further details). The system uses the destination and date information to search for possible travel options (predefined process 1620, see FIG. 18 for further details). The system returns one or more options to the user and the user can select preferred options from the returned set of options (predefined process 1630, see FIG. 19 for further details). Using the user's preferred options, the system optimizes those options (predefined process 1640, see FIGS. 19 and 20 for further details) in order to identify better options in terms of factors the user has deemed important (i.e. price, convenience, travel time, etc.). The user can select from the optimized choices and book all or some of the travel services (predefined process 1650, see FIG. 19 for further details). As travel options are dynamic in terms of pricing, availability, and other factors, the steps of optimizing the travel options and booking travel options continues until the destination time arrives (loop 1660) in order for the user to take advantage of any price reductions that become available or to be notified if a travel service, such as hotel rooms, is becoming constrained at the travel destination. Processing continues until the travel takes place whereupon it terminates at 1690.

Figure 17:
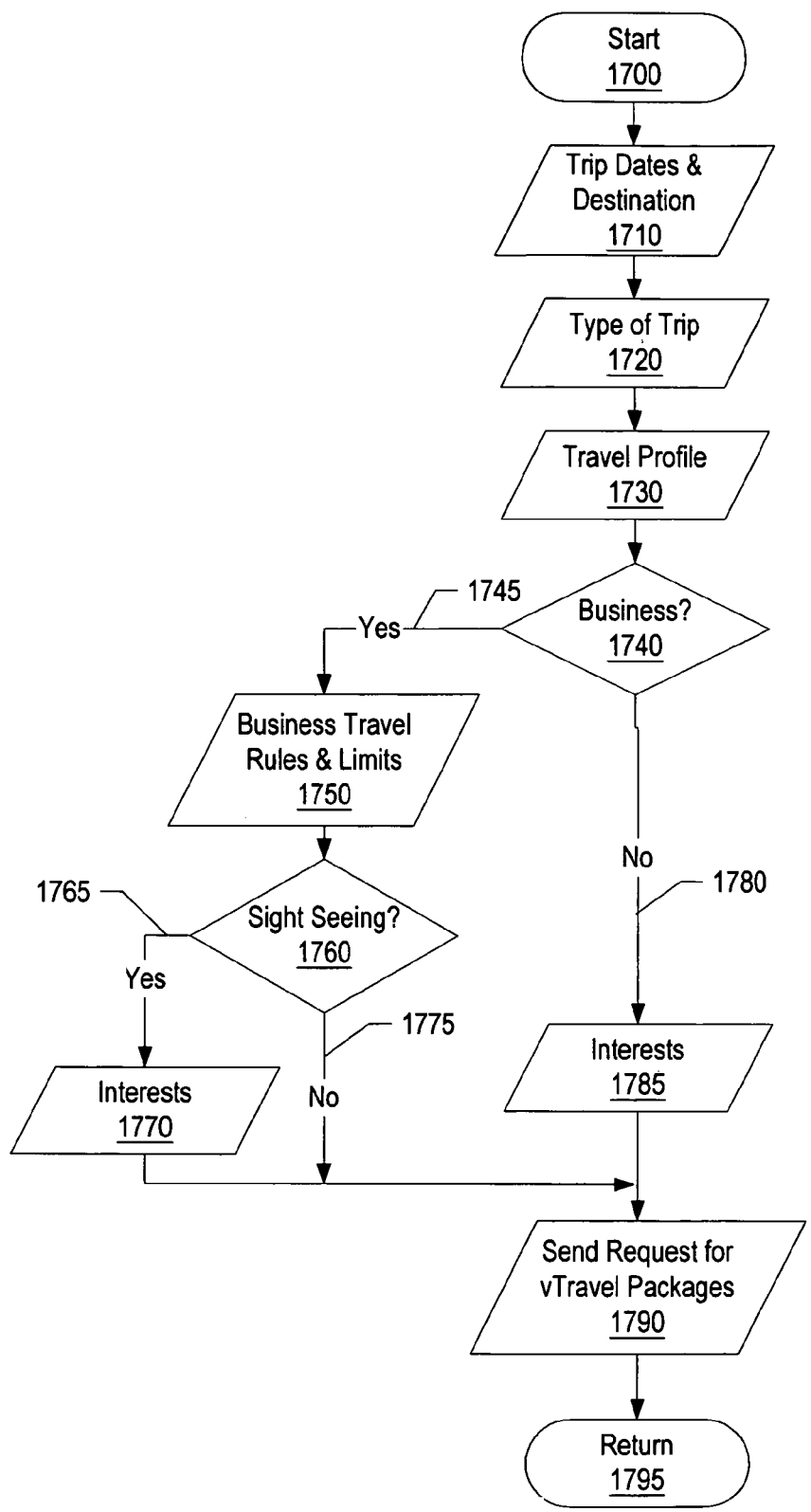
FIG. 17 is a flowchart for inputting user trip information.

FIG. 17 is a flowchart for inputting user trip information and sending the information to the calendar server. Processing commences at 1700 whereupon the user enters trip dates and a destination address (input 1710). A more accurate destination address (e.g., a street address) will allow the city to identify travel services such as hotels and ground transportation that best suit the user's needs. The user also indicates what type of trip he is taking (input 1720). If the user is taking a business trip, certain business travel policies and rules may apply. The system reads the user's travel profile (input 1730) that contains many of the user's travel preferences (see FIG. 13 for one example of a travel profile screen). If the user is taking a business trip, decision 1740 branches to "yes" branch 1745, otherwise "no" branch 1780 is taken. "Yes" branch 1745 processing includes reading any business rules and travel policies that may be set by the business (input 1750). For example, a business may have hotel limits for various cities and the user needs to find a hotel room that is not greater than the limit. Another example may be that the company wants the user to use the airline with the lowest flight cost regardless of whether the user prefers that airline. If the user specified that he wishes to do some sightseeing while traveling, decision 1760 branches to "yes" branch 1765. The user indicated whether he was planning on sightseeing in input 1720 when specifying the type of trip being taken. If the user does plan on doing some sightseeing while on his business trip, interest are read (input 1770) to further assist the user in making travel plans. Interests can be entered by the user or included in a travel profile. For example, if the user enjoys theatre or live music, the system can take this information into account and suggest events taking place in the destination city. If the user is interested in the suggested events, then tickets for the events can be purchased along with the other travel related services being purchased. The user can also indicate whether he should be billed separately in order to keep personal side trip expenses from appearing on business expense receipts.

If the user is not taking a business trip, "no" branch 1780 is taken whereupon personal interest information is read (input 1785) in order to suggest possible events that the user may wish to attend. Personal interest recommendations are done in a substantially similar manner as the personal interests read in input 1770 and described above.

After the user's interests have been read and any business rules or policies have been read, the travel request is packaged and sent to a server for identifying possible travel options for the user (output 1790). Processing for this section concludes at return 1795.

Figure 18:
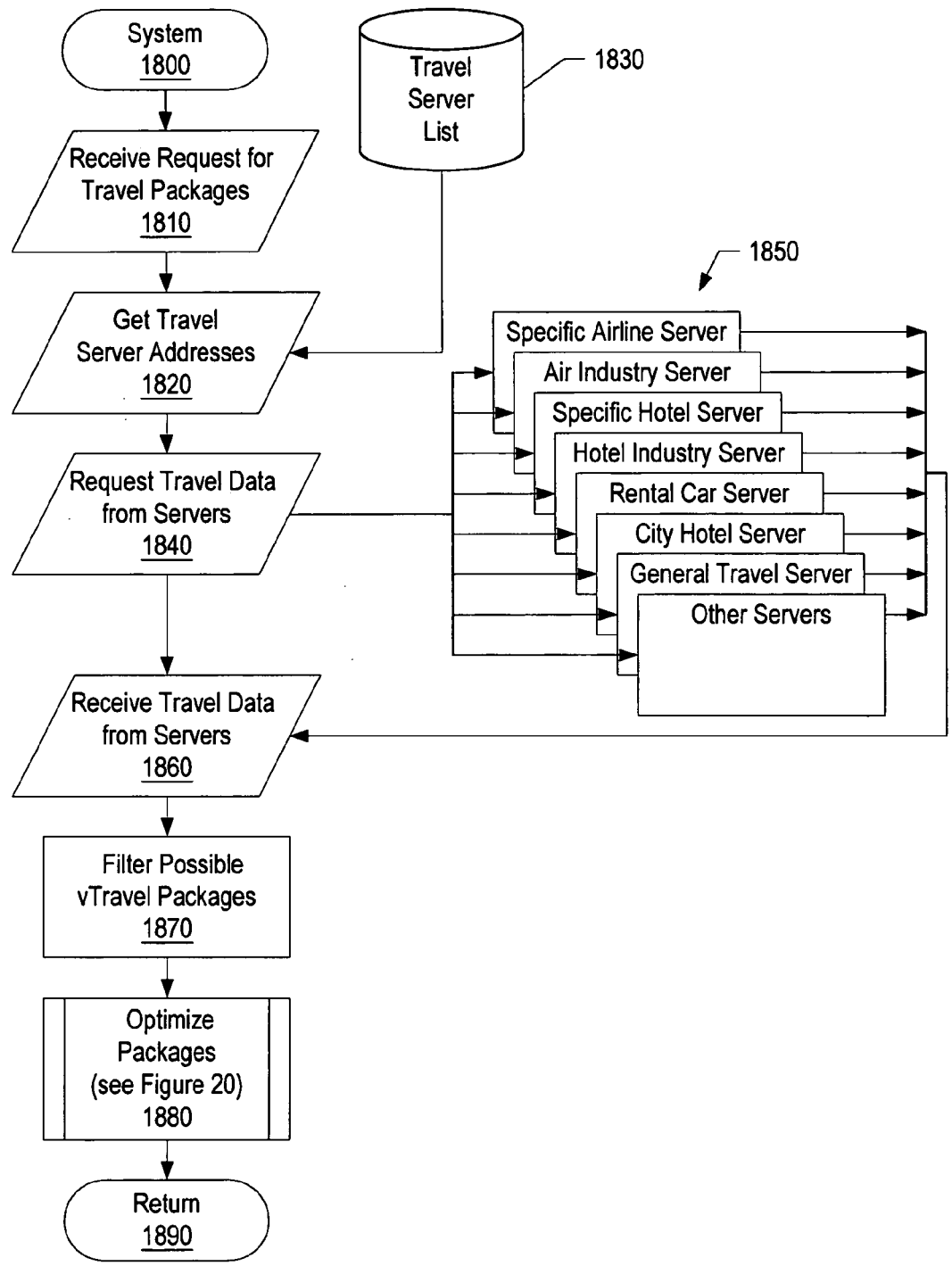
FIG. 18 is a flowchart for searching service agent servers for possible travel packages.

FIG. 18 is a flowchart for searching service agent servers for possible travel packages. System processing commences at 1800 whereupon the user's request for travel packages is received (input 1810). The request received was sent to the server during output 1790 (see FIG. 17). The server contacts other servers that store data regarding travel operations. Travel server list 1830 is either maintained at the server or may be stored on a network server (i.e. on the Internet) and shared amongst multiple servers. Server may utilize general purpose travel server lists in addition to local travel server lists that have been identified by the company or individual user. Travel server lists are read (input 1820) providing addresses (e.g., URLS) of travel servers. One or more travel servers 1850 are contacted to gather travel information. The server contacts those travel servers that have information that is of potential interest to the user. Travel servers include both specific and general servers. For example, if the user is flying, both general and airline specific travel servers will be contacted. On the other hand, if the user is driving to the destination such airline servers would not be contacted. For example, a particular airline server may be queried to obtain the latest information on that airline. In addition, or alternatively, industry servers may provide the same information, for example the Sabre™ airline reservation system used by travel agents and containing information about virtually all domestic airline flights. The same specific and general servers apply to hotel information and ground transportation information. Other travel servers, such as servers relating to a particular destination, may also be queried to gather information concerning events taking place in or near the destination. Responses to the server's queries are received by the server (input 1860). The received responses are filtered (step 1870) to eliminate unusable options (such as options that fail any business rules or policies). The remaining options are also sorted (step 1880) to order the returned options along the ranking parameters established by the user (see 1305, 1310, 1332, and 1352 from FIG. 13). Processing for this section then concludes at return 1890.

Figure 19:
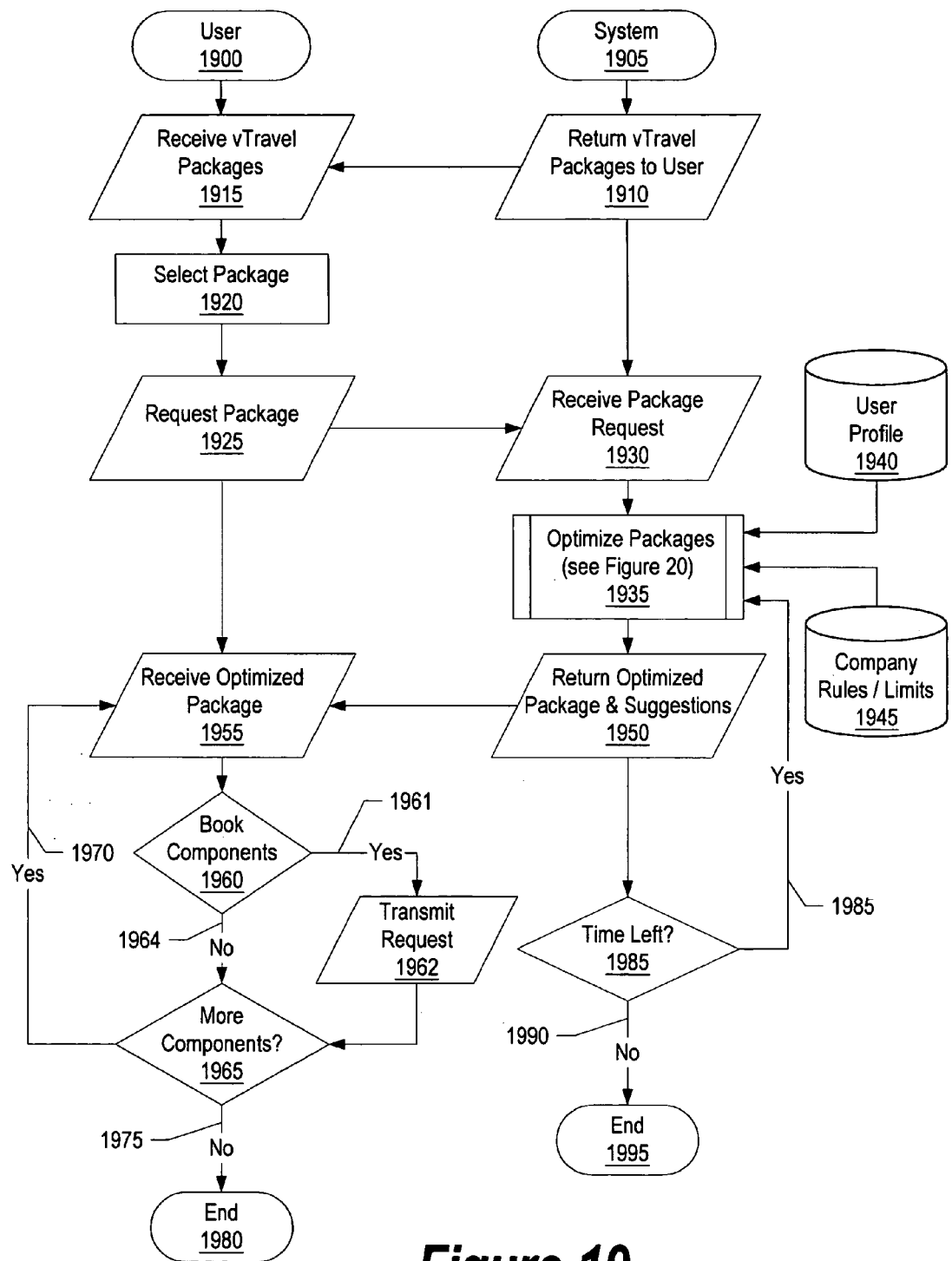
FIG. 19 is a flowchart for optimizing and booking components within a desired travel package.

FIG. 19 is a flowchart for optimizing and booking components within a desired travel package. System processing 1905 commences with the filtered and sorted travel packages (filtered in step 1870 and optimized in step 1880 in FIG. 18) being returned to the user (output 1910). User processing 1900 consequently commences with receiving the filtered and sorted travel packages (input 1915). The user analyzes the available packages and chooses a package in which he is most interested (step 1920). This package request is sent (output 1925) to the server for further processing and optimization. The server, in turn, receives the user's package request (input 1930) and optimizes the package (step 1935) using user profile 1940 and company rules and policies 1945 (if the trip is a business trip). Optimization (step 1935) takes place using the importance factors set forth by the business and the user. If price is most important, for example, the system attempts to find the lowest price for the user's desired package. On the other hand, if a particular airline is most important the airline may be selected even if its price is slightly higher than another airline. Optimization may further include requesting more detail or discounts from travel service providers (see 1840, 1850, and 1860 from FIG. 18). Optimization further includes providing suggestions to the user based on the current travel environment. For example, if hotels in the destination city are scarce due to a convention, the user is informed that he may wish to act quickly in booking a hotel room. Also, if airline rates are only valid for a certain amount of time, the user is informed of this so that he can purchase his tickets before the cost increases. Once the user's selected package is optimized and any travel suggestions are noted by the server, the information is returned to the user (output 1950). The user, in turn, receives the optimized package information (input 1955). If he wishes to book one or more of the travel components (decision 1960), "yes" branch 1961 is taken whereupon a a message is transmitted to a travel agent or travel service provider (output 1962). Output 1962 may be encrypted using public key/private key encryption or using digital certificates as it may contain confidential information, such as credit card numbers, that the user does not want third parties to intercept. If the user does not wish to book any component, "no" branch 1964 it taken. If more components are left to be booked, decision 1965 branches to "yes" branch 1970 looping back to receive further optimized travel package components. The server continues to send further optimized travel components in order for the user to take advantage of any specials and to be informed of changes in the travel environment such as a shortage of hotel rooms or seats on airlines. When no more components need to be booked (or when the travel dates of the trip have passed), "no" branch 1975 is taken and user processing ends at 1980. At the server, after the server sends optimized travel components (output 1950) it checks (decision 1985) whether there is time left (i.e. whether the user's trip has already occurred). If there is time remaining, "yes" branch 1985 is taken looping back to check for any changes to the travel components by re-optimizing the travel components (step 1935) and sending the optimized results to the user (output 1950). If there is not time left, "no" branch 1990 is taken and processing terminates at 1995.

Figure 20:
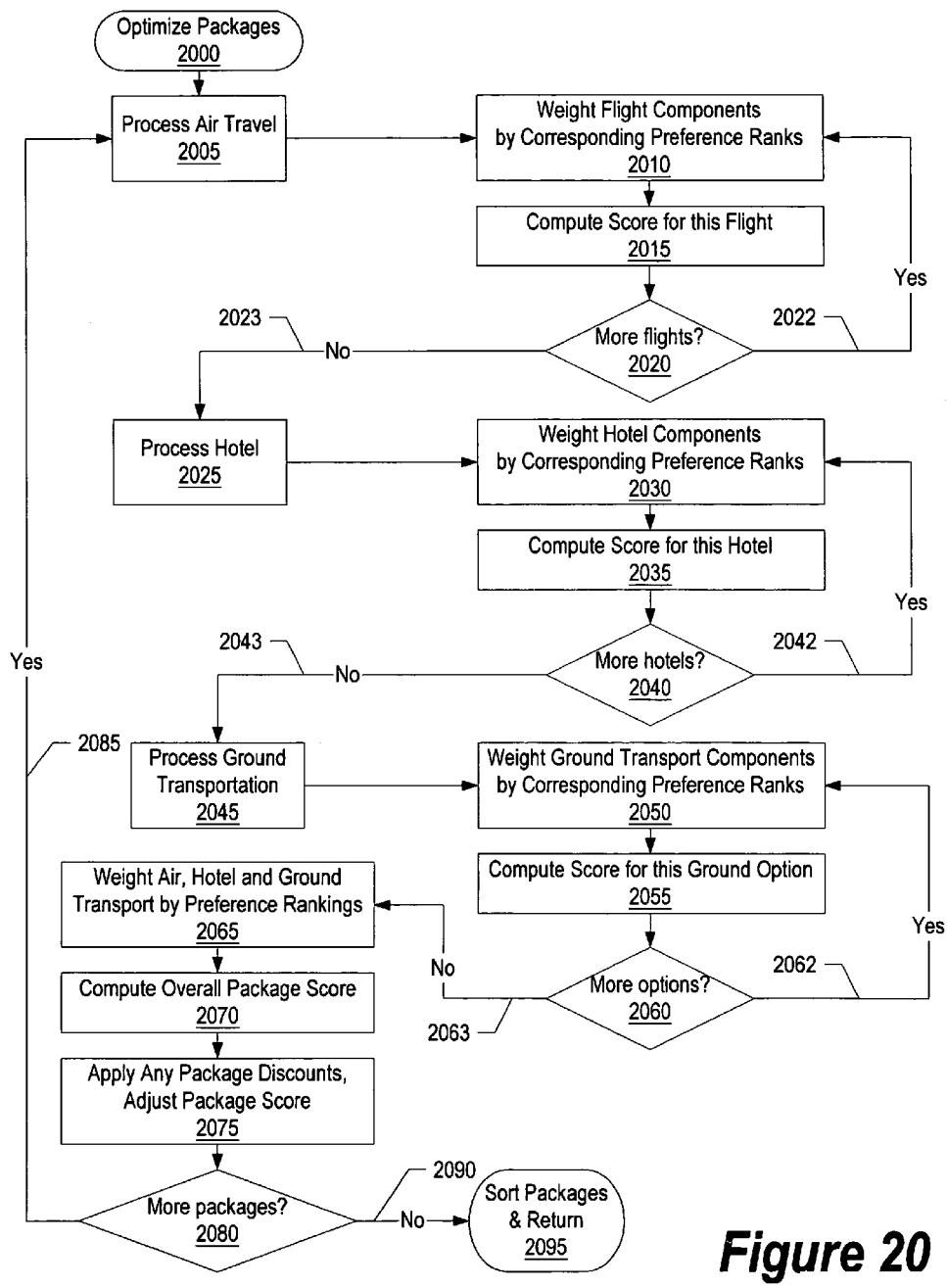
FIG. 20 is a flowchart for optimizing components within travel packages.

FIG. 20 shows a flowchart for optimizing components within travel packages. Processing commences at 2000 whereupon air travel components for a received air travel option are processed (step 2005). Air travel factors are weighted (step 2010) by their corresponding rank values (see rank values 1310 in FIG. 13). An overall score for the flight is determined by combining the scores for the various components (step 2015). In this manner, flights matching user preferences, such as low cost, receive generally higher scores. Decision 2020 determines whether more flights for the package need to be analyzed. If more flights need to be analyzed, "yes" branch 2022 is taken looping back to step 2010. If no more flights need to be analyzed, "no" branch 2023 is taken whereupon hotel components for a received hotel option are processed (step 2025).

Hotel travel factors are weighted (step 2030) by their corresponding rank values (see rank values 1332 in FIG. 13). An overall score for the hotel is determined by combining the scores for the various components (step 2035). In this manner, hotels matching user preferences, such as low cost, receive generally higher scores. Decision 2040 determines whether more hotels for the package need to be analyzed. If more hotels need to be analyzed, "yes" branch 2042 is taken looping back to step 2030. If no more hotels need to be analyzed, "no" branch 2043 is taken whereupon ground transportation components for a received ground transportation option are processed (step 2045).

Ground transportation factors are weighted (step 2050) by their corresponding rank values (see rank values 1352 in FIG. 13). An overall score for the ground transportation option is determined by combining the scores for the various components (step 2055). In this manner, ground transportation options matching user preferences, such as low cost, receive generally higher scores. Decision 2060 determines whether more ground transportation options for the package need to be analyzed. If more ground transportation options need to be analyzed, "yes" branch 2062 is taken looping back to step 2050.

If no more ground transportation options need to be analyzed, "no" branch 2063 is taken whereupon the air, hotel, and ground transportation scores are weighted (step 2065) by the user's rankings (see rank values 1305 in FIG. 13). In this way, if the user considers the air travel component of the package more important than the hotel or ground transportation factors, the air transportation will be more heavily weighted than the other package components. Likewise, if the user is going on a vacation, he may decide to weight the hotel portion of the package more heavily than the other package components. An overall score is computed (step 2070) for the package by combining the air, hotel, and ground transportation scores. Finally, some packages (e.g., for travel to a convention) may include combination discounts, such as reduced airfare on a particular airline and free shuttle service when the user stays at a particular hotel. These combination services are applied to the package (step 2075) and the package score is adjusted accordingly. If there are more packages to analyze, decision 2080 branches to "yes" branch 2085 looping back to the beginning of the processing (step 2005) in order to analyze the air, hotel, and ground transportation components of the next package. If, on the other hand, no more packages need to be analyzed, "no" branch 2090 is taken whereupon the collected packages are sorted based on their overall scores and processing returns (step 2095) to the calling routine (see predefined process 1880 from FIG. 18 and predefined process 1935 from FIG. 19).

Figure 21:
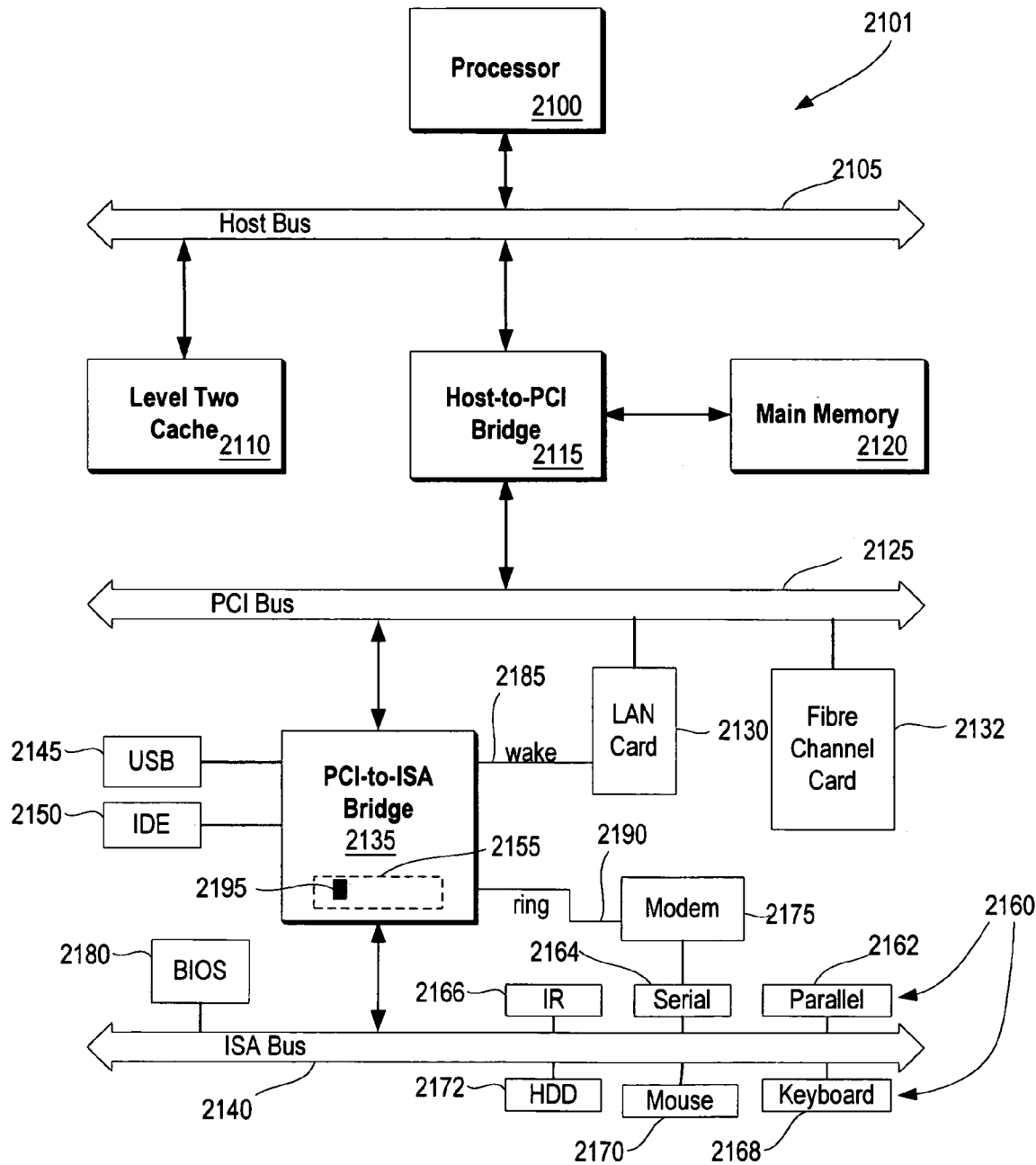
FIG. 21 is a block diagram of an information handling system capable of implementing the present invention.

FIG. 21 illustrates information handling system 2101 which is a simplified example of a computer system capable of performing the present invention. Computer system 2101 includes processor 2100 which is coupled to host bus 2105. A level two (L2) cache memory 2110 is also coupled to the host bus 2105. Host-to-PCI bridge 2115 is coupled to main memory 2120, includes cache memory and main memory control functions, and provides bus control to handle transfers among PCI bus 2125, processor 2100, L2 cache 2110, main memory 2120, and host bus 2105. PCI bus 2125 provides an interface for a variety of devices including, for example, LAN card 2130. PCI-to-ISA bridge 2135 provides bus control to handle transfers between PCI bus 2125 and ISA bus 2140, universal serial bus (USB) functionality 2145, IDE device functionality 2150, power management functionality 2155, and can include other functional elements not shown, such as a real-time clock (RTC), DMA control, interrupt support, and system management bus support. Peripheral devices and input/output (I/O) devices can be attached to various interfaces 2160 (e.g., parallel interface 2162, serial interface 2164, infrared (IR) interface 2166, keyboard interface 2168, mouse interface 2170, and fixed disk (HDD) 2172) coupled to ISA bus 2140. Alternatively, many I/O devices can be accommodated by a super I/O controller (not shown) attached to ISA bus 2140.

BIOS 2180 is coupled to ISA bus 2140, and incorporates the necessary processor executable code for a variety of low-level system functions and system boot functions. BIOS 2180 can be stored in any computer readable medium, including magnetic storage media, optical storage media, flash memory, random access memory, read only memory, and communications media conveying signals encoding the instructions (e.g., signals from a network). In order to attach computer system 2101 another computer system to copy files over a network, LAN card 2130 is coupled to PCI-to-ISA bridge 2135. Similarly, to connect computer system 2101 to an ISP to connect to the Internet using a telephone line connection, modem 2175 is connected to serial port 2164 and PCI-to-ISA Bridge 2135.

While the computer system described in FIG. 21 is capable of executing the invention described herein, this computer system is simply one example of a computer system. Those skilled in the art will appreciate that many other computer system designs are capable of performing the copying process described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of handling travel arrangements, said method comprising:

scheduling the travel arrangements using a computer system;

recording the scheduled travel arrangements on a nonvolatile storage device connected to the computer system; and sending one or more automated requests corresponding to the travel arrangements from the computer system to one or more service agents, wherein the automated requests are based on a traveler's user profile, and wherein at least one of the service agents are selected from the group consisting of a delivery service agent, a telephone system, an electronic calendar system, and a medical information system;

wherein the delivery service agent includes one or more parcel services, and wherein the automated requests include one of holding packages for customer pickup, delivering packages on a future date, and leaving packages with a neighbor.

2. A method of handling travel arrangements, said method comprising:

scheduling the travel arrangements using a computer system;

recording the scheduled travel arrangements on a nonvolatile storage device connected to the computer system; and sending one or more automated requests corresponding to the travel arrangements from the computer system to one or more service agents, wherein the automated requests are based on a traveler's user profile, and wherein at least one of the service agents are selected from the group consisting of a delivery service agent, a telephone system, an electronic calendar system, and a medical information system;

wherein the delivery service agent includes a post office, and wherein the automated requests include at least one of holding mail for customer pickup, delivering mail on a future date, and forwarding mail to another address.

3. A method of handling travel arrangements, said method comprising:

scheduling the travel arrangements using a computer system;

recording the scheduled travel arrangements on a nonvolatile storage device connected to the computer system; and sending one or more automated requests corresponding to the travel arrangements from the computer system to one or more service agents, wherein the automated requests are based on a traveler's user profile, and wherein at least one of the service agents are selected from the group consisting of a delivery service agent, a telephone system, an electronic calendar system, and a medical information system;

wherein the service agents include one or more of the telephone systems and wherein the sending automated requests include configuring instructions corresponding to a telephone.

4. A method of handling travel arrangements, said method comprising:

scheduling the travel arrangements using a computer system;

recording the scheduled travel arrangements on a nonvolatile storage device connected to the computer system; and sending one or more automated requests corresponding to the travel arrangements from the computer system to one or more service agents, wherein the automated requests are based on a traveler's user profile, and wherein at least one of the service agents are selected from the group consisting of a delivery service agent, a telephone system, an electronic calendar system, and a medical information system; wherein the service agents include one or more of the telephone systems and wherein the sending automated requests include configuring instructions corresponding to a telephone; and wherein the configuring requests include at least one of changing a voicemail greeting, forwarding calls received at a first phone number to a second phone number, transferring a caller to an alternate phone number, and providing the caller with an emergency contact.

5. A method of handling travel arrangements, said method comprising:

scheduling the travel arrangements using a computer system;

recording the scheduled travel arrangements on a nonvolatile storage device connected to the computer system; and sending one or more automated requests corresponding to the travel arrangements from the computer system to one or more service agents, wherein the automated requests are based on a traveler's user profile, and wherein at least one of the service agents are selected from the group consisting of a delivery service agent, a telephone system, an electronic calendar system, and a medical information system; wherein the service agents include one or more of the telephone systems and wherein the sending automated requests include configuring instructions corresponding to a telephone; and registering the telephone with an email system prior to the configuring, wherein the registering includes sending a message to the email system.

6. A method of handling travel arrangements, said method comprising:

scheduling the travel arrangements using a computer system;

recording the scheduled travel arrangements on a nonvolatile storage device connected to the computer system; and sending one or more automated requests corresponding to the travel arrangements from the computer system to one or more service agents, wherein the automated requests are based on a traveler's user profile, and wherein at least one of the service agents are selected from the group consisting of a delivery service agent, a telephone system, an electronic calendar system, and a medical information system; wherein the service agents include one or more of the telephone systems and wherein the sending automated requests include configuring instructions corresponding to a telephone; and setting a backup contact name, wherein the backup contact name corresponds with an alternate phone number; and receiving a predefined signal from a calling telephone requesting the transferring to the alternate phone number.

7. A method of handling travel arrangements, said method comprising:

scheduling the travel arrangements using a computer system;

recording the scheduled travel arrangements on a nonvolatile storage device connected to the computer system;

sending one or more automated requests corresponding to the travel arrangements from the computer system to one or more service agents, wherein the automated requests are based on a traveler's user profile, and wherein at least one of the service agents are selected from the group consisting of a delivery service agent, a telephone system, an electronic calendar system, and a medical information system;

receiving the automated request at the medical information system; and downloading destination related medical information to a computing device that is accessible by a user in response to the received request.

8. A method of handling travel arrangements, said method comprising:

scheduling the travel arrangements using a computer system;

recording the scheduled travel arrangements on a nonvolatile storage device connected to the computer system; and sending one or more automated requests corresponding to the travel arrangements from the computer system to one or more service agents, wherein the automated requests are based on a traveler's user profile, and wherein at least one of the service agents are selected from the group consisting of a delivery service agent, a telephone system, an electronic calendar system, and a medical information system; and wherein the medical information corresponds with one or more medical services offered at a travel destination.

9. An information handling system comprising:
one or more processors;
a memory accessible by the processors;
a nonvolatile storage device accessible by the processors; and
a travel automation tool, the travel automation tool including:
  means for scheduling travel arrangements using a computer system;
  means for recording the scheduled travel arrangements on the nonvolatile storage device;
  means for sending one or more automated requests corresponding to the travel arrangements from the computer system to one or more service agents, wherein the automated requests are based on a traveler's user profile, and wherein at least one of the service agents are selected from the group consisting of a delivery service agent, a telephone system, an electronic calendar system, and a medical information system;
  means for receiving the automated request at a second information handling system;
  means for searching a database connected to the second information handling system for requested information; and
  means for downloading destination related medical information resulting from the searching to a computing device that is accessible by a user.

10. A computer program product stored in a computer storage media, the computer storage media containing instructions for execution by a computer, which, when executed by the computer, cause the computer to implement a method for handling travel arrangements, said method comprising:
  scheduling the travel arrangements using a computer system;
  recording the scheduled travel arrangements on a nonvolatile storage device connected to the computer system; and
  sending one or more automated requests corresponding to the travel arrangements from the computer system to one or more service agents, wherein the automated requests are based on a traveler's user profile, and wherein at least one of the service agents are selected from the group consisting of a delivery service agent, a telephone system, an electronic calendar system, and a medical information system;
  wherein the service agents include one or more of the telephone systems and
  wherein the sending automated requests include configuring a telephone based on the automated requests.

11. A method of handling travel arrangements, said method comprising:
  scheduling the travel arrangements using a computer system;
  recording the scheduled travel arrangements on a nonvolatile storage device connected to the computer system; and
  sending one or more automated requests corresponding to the travel arrangements from the computer system to one or more service agents, wherein the automated requests are based on a traveler's user profile, and wherein at least one of the service agents are selected from the group consisting of a delivery service agent, a telephone system, an electronic calendar system, and a medical information system;
  wherein one of the automated requests results in increasing a user's electronic wallet balance and decreasing a user's bank account balance, the user corresponding to the travel arrangements.

12. A method of handling travel arrangements, said method comprising:
  scheduling the travel arrangements using a computer system;
  recording the scheduled travel arrangements on a nonvolatile storage device connected to the computer system;
  sending one or more automated requests corresponding to the travel arrangements from the computer system to one or more service agents, wherein the automated requests are based on a traveler's user profile, and wherein at least one of the service agents are selected from the group consisting of a delivery service agent, a telephone system, an electronic calendar system, and a medical information system;
  receiving the automated request at the electronic calendar system; and
  updating an electronic calendar maintained by the electronic calendar system with information related to the travel arrangements.

* * * * *